United States Patent
Alexander et al.

(10) Patent No.: US 11,467,833 B2
(45) Date of Patent: Oct. 11, 2022

(54) LOAD-STORE INSTRUCTION FOR PERFORMING MULTIPLE LOADS, A STORE, AND STRIDED INCREMENT OF MULTIPLE ADDRESSES

(71) Applicant: Graphcore Limited, Bristol (GB)

(72) Inventors: Alan Graham Alexander, Wotton-Under-Edge (GB); Simon Christian Knowles, Corston (GB); Mrudula Chidambar Gore, Bath (GB)

(73) Assignee: Graphcore Limited, Bristol (GB)

( * ) Notice: Subject to any disclaimer, the term of this patent is extended or adjusted under 35 U.S.C. 154(b) by 403 days.

(21) Appl. No.: 16/276,872

(22) Filed: Feb. 15, 2019

(65) Prior Publication Data

US 2020/0210187 A1    Jul. 2, 2020

(30) Foreign Application Priority Data

Dec. 31, 2018 (GB) ...................... 1821300

(51) Int. Cl.
*G06F 9/312* (2018.01)
*G06F 9/345* (2018.01)
(Continued)

(52) U.S. Cl.
CPC ........ *G06F 9/30043* (2013.01); *G06F 9/3001* (2013.01); *G06F 9/30101* (2013.01);
(Continued)

(58) Field of Classification Search
CPC ............. G06F 9/30043; G06F 9/30101; G06F 9/3455; G06F 9/38; G06F 17/16; G06F 9/3001; G06F 9/30109
See application file for complete search history.

(56) References Cited

U.S. PATENT DOCUMENTS 3,417,375 A * 12/1968 Packard .............. G06F 9/30032
                                                        711/113
6,795,908 B1    9/2004 Lee
(Continued)

FOREIGN PATENT DOCUMENTS

WO    2012134555 A1    10/2012
WO    2013048369 A9    4/2013

OTHER PUBLICATIONS

Hennessy et al., "Computer Architecture—A Quantitative Approach", 2nd Edition, 1996, pp. 224-228.*
(Continued)

*Primary Examiner* — David J. Huisman
(74) *Attorney, Agent, or Firm* — Haynes and Boone, LLP

(57) ABSTRACT

A processor having an instruction set including a load-store instruction having operands specifying, from amongst the registers in at least one register file, a respective destination of each of two load operations, a respective source of a store operation, and a pair of address registers arranged to hold three memory addresses, the three memory addresses being a respective load address for each of the two load operations and a respective store address for the store operation. The load-store instruction further includes three stride operands each specifying a respective stride value for each of the two load addresses and one store address, wherein at least some possible values of each stride operand specify the respective stride value by specifying one of a plurality of fields within a stride register in one of the one or more register files, each field holding a different stride value.

31 Claims, 11 Drawing Sheets

(51) Int. Cl.
    *G06F 9/30*         (2018.01)
    *G06F 9/38*         (2018.01)
    *G06F 17/16*       (2006.01)

(52) U.S. Cl.
    CPC ........ *G06F 9/30109* (2013.01); *G06F 9/3455* (2013.01); *G06F 9/38* (2013.01); *G06F 17/16* (2013.01)

(56) References Cited

U.S. PATENT DOCUMENTS

| | | |
|---|---|---|
| 9,804,844 B2 | 10/2017 | Ould-Ahmed-Vall |
| 2014/0052961 A1* | 2/2014 | Vorbach ................ G06F 9/3017 |
| | | 712/33 |
| 2017/0249144 A1* | 8/2017 | Jaget .................. G06F 9/30145 |

OTHER PUBLICATIONS

Combined Search and Examination Report for United Kingdom Patent Application No. GB1821300.9 dated Aug. 29, 2019. 4 pages.
Kim et al., "New Machine Instruction Enhance Machine Performance", 1977, IBM TDB 09-77, pp. 1649-1650.
Office Action dated Jun. 5, 2020 for Canadian Patent Application No. 3,040,794.
Office Action dated Sep. 1, 2020 for Japanese patent application No. 2019-113316. 4 pages.

* cited by examiner

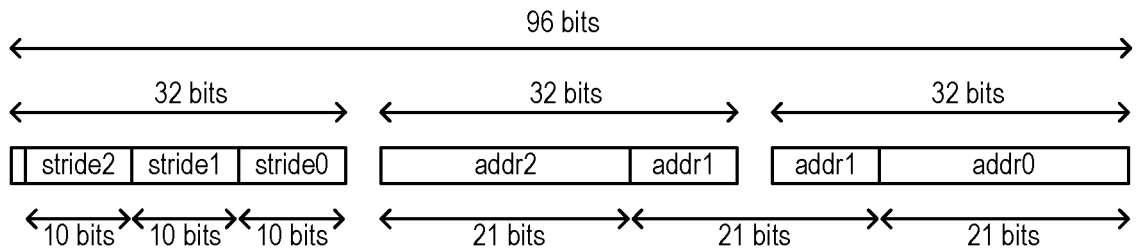
FIG. 7
FIG. 8
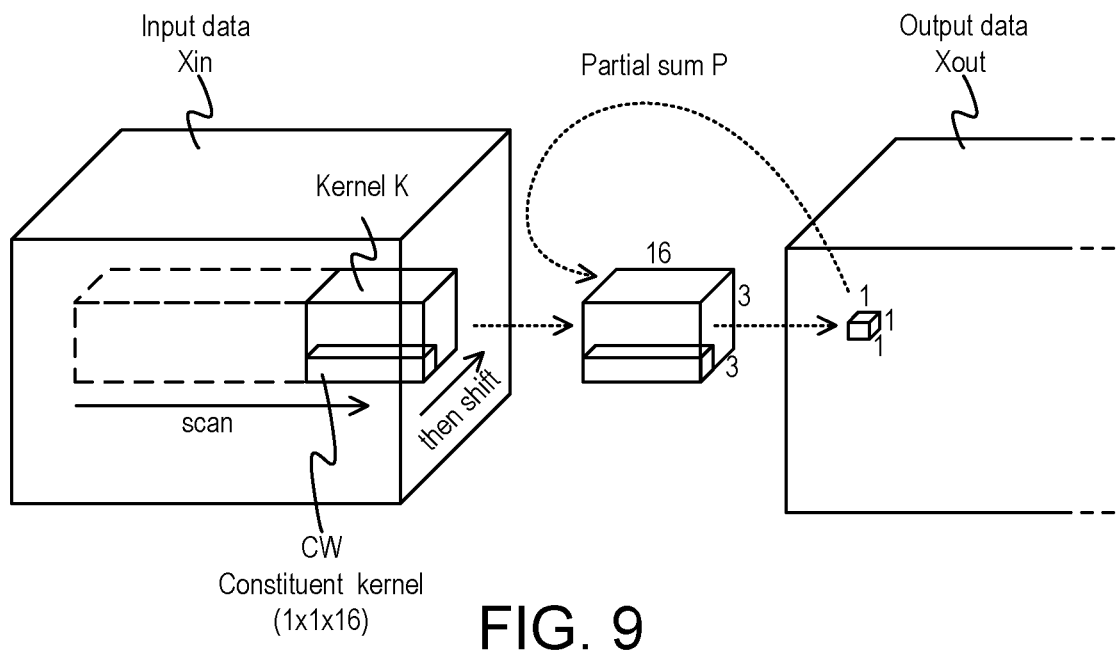
FIG. 9

| $aSrc0\|1 | $AACC[14] | $AACC[12] | $AACC[10] | $AACC[8] |
|---|---|---|---|---|
| $0^3$\|$P_1$ | - | - | - | - |
| 0\|$P_2,P_3$ | - | - | - | - |
| 0\|$P_4,P_5$ | - | - | - | [WARM UP] |
| 0\|$P_6,P_7$ | - | - | - | - |
| $x_0$\|$P_8,P_9$ | $R_7=x_0 \cdot CW_{7,0}+P_7$ | $R_6=x_0 \cdot CW_{6,0}+P_6$ | $R_5=x_0 \cdot CW_{5,0}+P_5$ | $R_4=x_0 \cdot CW_{4,0}+P_4$ |
| $x_1$\|$P_{10},P_{11}$ | $R_7=x_1 \cdot CW_{7,1}$ | $R_6=x_1 \cdot CW_{6,1}$ | $R_5=x_1 \cdot CW_{5,1}$ | $R_4=x_1 \cdot CW_{4,1}$ |
| $x_2$\|$P_{12},P_{13}$ | $R_7=x_2 \cdot CW_{7,2}$ | $R_6=x_2 \cdot CW_{6,2}$ | $R_5=x_2 \cdot CW_{5,2}$ | $R_4=x_2 \cdot CW_{4,2}$ |
| $x_3$\|$P_{14},P_{15}$ | $R_7=x_3 \cdot CW_{7,3}$ | $R_6=x_3 \cdot CW_{6,3}$ | $R_5=x_3 \cdot CW_{5,3}$ | $R_4=x_3 \cdot CW_{4,3}$ |
| $x_4$\|$P_{16},P_{17}$ | $R_{15}=x_4 \cdot CW_{7,0}+P_{15}$ | $R_{14}=x_4 \cdot CW_{6,0}+P_{14}$ | $R_{13}=x_4 \cdot CW_{5,0}+P_{13}$ | $R_{12}=x_4 \cdot CW_{4,0}+P_{12}$ |
| $x_5$\|$P_{18},P_{19}$ | $R_{15}=x_5 \cdot CW_{7,1}$ | $R_{14}=x_5 \cdot CW_{6,1}$ | $R_{13}=x_5 \cdot CW_{5,1}$ | $R_{12}=x_5 \cdot CW_{4,1}$ |
| $x_6$\|$P_{20},P_{21}$ | $R_{15}=x_6 \cdot CW_{7,2}$ | $R_{14}=x_6 \cdot CW_{6,2}$ | $R_{13}=x_6 \cdot CW_{5,2}$ | $R_{12}=x_6 \cdot CW_{4,2}$ |
| $x_7$\|$P_{22},P_{23}$ | $R_{15}=x_7 \cdot CW_{7,3}$ | $R_{14}=x_7 \cdot CW_{6,3}$ | $R_{13}=x_7 \cdot CW_{5,3}$ | $R_{12}=x_7 \cdot CW_{4,3}$ |
| $x_8$\|$P_{24},P_{25}$ | $R_{31}=x_8 \cdot CW_{7,0}+P_{23}$ | $R_{22}=x_8 \cdot CW_{6,0}+P_{22}$ | $R_{21}=x_8 \cdot CW_{5,0}+P_{21}$ | $R_{20}=x_8 \cdot CW_{4,0}+P_{20}$ |
| $x_9$\|$P_{26},P_{27}$ | $R_{23}=x_9 \cdot CW_{7,1}$ | $R_{22}=x_9 \cdot CW_{6,1}$ | $R_{21}=x_9 \cdot CW_{5,1}$ | $R_{20}=x_9 \cdot CW_{4,1}$ |
| $x_{10}$\|$P_{28},P_{29}$ | $R_{23}=x_{10} \cdot CW_{7,2}$ | $R_{22}=x_{10} \cdot CW_{6,2}$ | $R_{21}=x_{10} \cdot CW_{5,2}$ | $R_{20}=x_{10} \cdot CW_{4,2}$ |
| $x_{11}$\|$P_{30},P_{31}$ | $R_{23}=x_{11} \cdot CW_{7,3}$ | $R_{22}=x_{11} \cdot CW_{6,3}$ | $R_{21}=x_{11} \cdot CW_{5,3}$ | $R_{20}=x_{11} \cdot CW_{4,3}$ |
| $x_{12}$\|$P_{32},P_{33}$ | $R_{31}=x_{12} \cdot CW_{7,0}+P_{31}$ | $R_{30}=x_{12} \cdot CW_{6,0}+P_{30}$ | $R_{29}=x_{12} \cdot CW_{5,0}+P_{29}$ | $R_{28}=x_{12} \cdot CW_{4,0}+P_{28}$ |

$P_n$ is a single-precision input partial-sum n
$x_n$ is an f16v4 input vector
$CW_{m,n}$ is the common weight state $CWEI_m_n
$R_n$ is the final single-precision result of successive dot-product accumulations that began with $P_n$

| $AACC[6] | $AACC[4] | $AACC[2] | $AACC[0] | $aDstO |
|---|---|---|---|---|
| [PERIOD] | - | - | - | - |
| $R_3 = x_0 \cdot CW_{3,0} + P_3$ | $R_2 = x_0 \cdot CW_{2,0} + P_2$ | $R_1 = x_0 \cdot CW_{1,0} + P_1$ | $R_0 = x_0 \cdot CW_{0,0} + P_0$ | - |
| $R_3 = x_1 \cdot CW_{3,1}$ | $R_2 = x_1 \cdot CW_{2,1}$ | $R_1 = x_1 \cdot CW_{1,1}$ | $R_0 = x_1 \cdot CW_{0,1}$ | - |
| $R_3 = x_2 \cdot CW_{3,2}$ | $R_2 = x_2 \cdot CW_{2,2}$ | $R_1 = x_2 \cdot CW_{1,2}$ | $R_0 = x_2 \cdot CW_{0,2}$ | - |
| $R_3 = x_3 \cdot CW_{3,3}$ | $R_2 = x_3 \cdot CW_{2,3}$ | $R_1 = x_3 \cdot CW_{1,3}$ | $R_0 = x_3 \cdot CW_{0,3}$ | - |
| $R_{11} = x_4 \cdot CW_{3,0} + P_{11}$ | $R_{10} = x_4 \cdot CW_{2,0} + P_{10}$ | $R_9 = x_4 \cdot CW_{1,0} + P_9$ | $R_8 = x_4 \cdot CW_{0,0} + P_8$ | $R_0, R_1$ |
| $R_{11} = x_5 \cdot CW_{3,1}$ | $R_{10} = x_5 \cdot CW_{2,1}$ | $R_9 = x_5 \cdot CW_{1,1}$ | $R_8 = x_5 \cdot CW_{0,1}$ | $R_2, R_3$ |
| $R_{11} = x_6 \cdot CW_{3,2}$ | $R_{10} = x_6 \cdot CW_{2,2}$ | $R_9 = x_6 \cdot CW_{1,2}$ | $R_8 = x_6 \cdot CW_{0,2}$ | $R_4, R_5$ |
| $R_{11} = x_7 \cdot CW_{3,3}$ | $R_{10} = x_7 \cdot CW_{2,3}$ | $R_9 = x_7 \cdot CW_{1,3}$ | $R_8 = x_7 \cdot CW_{0,3}$ | $R_6, R_7$ |
| $R_{19} = x_8 \cdot CW_{3,0} + P_{19}$ | $R_{18} = x_8 \cdot CW_{2,0} + P_{18}$ | $R_{17} = x_8 \cdot CW_{1,0} + P_{17}$ | $R_{16} = x_8 \cdot CW_{0,0} + P_{16}$ | $R_8, R_9$ |
| $R_{19} = x_9 \cdot CW_{3,1}$ | $R_{18} = x_9 \cdot CW_{2,1}$ | $R_{17} = x_9 \cdot CW_{1,1}$ | $R_{16} = x_9 \cdot CW_{0,1}$ | $R_{10}, R_{11}$ |
| $R_{19} = x_{10} \cdot CW_{3,2}$ | $R_{18} = x_{10} \cdot CW_{2,2}$ | $R_{17} = x_{10} \cdot CW_{1,2}$ | $R_{16} = x_{10} \cdot CW_{0,2}$ | $R_{12}, R_{13}$ |
| $R_{19} = x_{11} \cdot CW_{3,3}$ | $R_{18} = x_{11} \cdot CW_{2,3}$ | $R_{17} = x_{11} \cdot CW_{1,3}$ | $R_{16} = x_{11} \cdot CW_{0,3}$ | $R_{14}, R_{15}$ |
| $R_{27} = x_{12} \cdot CW_{3,0} + P_{27}$ | $R_{26} = x_{12} \cdot CW_{2,0} + P_{26}$ | $R_{25} = x_{12} \cdot CW_{1,0} + P_{25}$ | $R_{24} = x_{12} \cdot CW_{0,0} + P_{24}$ | $R_{16}, R_{17}$ |

Table 3.156: f16v4sisoslic, 1x4 example sequence

| $aSrc0|1 | $AACC[14] | $AACC[10] | $AACC[6] | $AACC[2] |
|---|---|---|---|---|
| $x_0|P_0,P_1$ | $R_1=x_0 \cdot CW_{7,0}+P_1$ | $R_1=x_0 \cdot CW_{5,0}+P_1$ | - | - |
| $x_1|P_2,P_3$ | $R_3=x_1 \cdot CW_{7,0}+P_3$ | $R_3=x_1 \cdot CW_{5,0}+P_3$ | $R_1=x_1 \cdot CW_{3,0}$ | - |
| $x_2|P_4,P_5$ | $R_5=x_2 \cdot CW_{7,0}+P_5$ | $R_5=x_2 \cdot CW_{5,0}+P_5$ | $R_3=x_2 \cdot CW_{3,0}$ | $R_1=x_2 \cdot CW_{1,0}$ |
| $x_3|P_6,P_7$ | $R_7=x_3 \cdot CW_{7,0}+P_7$ | $R_7=x_3 \cdot CW_{5,0}+P_7$ | $R_5=x_3 \cdot CW_{3,0}$ | $R_3=x_3 \cdot CW_{1,0}$ |
| $x_4|P_8,P_9$ | $R_9=x_4 \cdot CW_{7,0}+P_9$ | $R_9=x_4 \cdot CW_{5,0}+P_9$ | $R_7=x_4 \cdot CW_{3,0}$ | $R_5=x_4 \cdot CW_{1,0}$ |
| $x_5|P_{10},P_{11}$ | $R_{11}=x_5 \cdot CW_{7,0}+P_{11}$ | $R_{11}=x_5 \cdot CW_{5,0}+P_{11}$ | $R_9=x_5 \cdot CW_{3,0}$ | $R_7=x_5 \cdot CW_{1,0}$ |
| $x_6|P_{12},P_{13}$ | $R_{13}=x_6 \cdot CW_{7,0}+P_{13}$ | $R_{13}=x_6 \cdot CW_{5,0}+P_{13}$ | $R_{11}=x_6 \cdot CW_{3,0}$ | $R_9=x_6 \cdot CW_{1,0}$ |

| $aSrc0|1 | $AACC[14] | $AACC[10] | $AACC[6] | $AACC[2] |
|---|---|---|---|---|
| $x_0|P_0,P_1$ | $R_1=x_0 \cdot CW_{7,0}+P_1$ | - | - | - |
| $x_1|P_2,P_3$ | $R_3=x_1 \cdot CW_{7,0}+P_3$ | $R_1=x_1 \cdot CW_{5,0}$ | - | - |
| $x_2|P_4,P_5$ | $R_5=x_2 \cdot CW_{7,0}+P_5$ | $R_3=x_2 \cdot CW_{5,0}$ | $R_1=x_2 \cdot CW_{3,0}$ | - |
| $x_3|P_6,P_7$ | $R_7=x_3 \cdot CW_{7,0}+P_7$ | $R_5=x_3 \cdot CW_{5,0}$ | $R_3=x_3 \cdot CW_{3,0}$ | $R_1=x_3 \cdot CW_{1,0}$ |
| $x_4|P_8,P_9$ | $R_9=x_4 \cdot CW_{7,0}+P_9$ | $R_7=x_4 \cdot CW_{5,0}$ | $R_5=x_4 \cdot CW_{3,0}$ | $R_3=x_4 \cdot CW_{1,0}$ |
| $x_5|P_{10},P_{11}$ | $R_{11}=x_5 \cdot CW_{7,0}+P_{11}$ | $R_9=x_5 \cdot CW_{5,0}$ | $R_7=x_5 \cdot CW_{3,0}$ | $R_5=x_5 \cdot CW_{1,0}$ |
| $x_6|P_{12},P_{13}$ | $R_{13}=x_6 \cdot CW_{7,0}+P_{13}$ | $R_{11}=x_6 \cdot CW_{5,0}$ | $R_9=x_6 \cdot CW_{3,0}$ | $R_7=x_6 \cdot CW_{1,0}$ |

$P_n$ is a single-precision input partial-sum n
$x_n$ is an f16v4 input vector
$CW_{m,n}$ is the common weight state $CWEI_m_n
$R_n$ is the final single-precision result of successive dot-product accumulations that began with $P_n$

FIG. 14A

| $AACC[12] | $AACC[8] | $AACC[4] | $AACC[0] | $aDstO |
|---|---|---|---|---|
| - | $R_0=x_0 \cdot CW_{4,0}+P_0$ | - | - | - |
| - | $R_2=x_1 \cdot CW_{4,0}+P_2$ | $R_0=x_1 \cdot CW_{2,0}$ | - | - |
| - | $R_4=x_2 \cdot CW_{4,0}+P_4$ | $R_2=x_2 \cdot CW_{2,0}$ | $R_0=x_2 \cdot CW_{0,0}$ | - |
| - | $R_6=x_3 \cdot CW_{4,0}+P_6$ | $R_4=x_3 \cdot CW_{2,0}$ | $R_2=x_3 \cdot CW_{0,0}$ | $R_0,R_1$ |
| - | $R_8=x_4 \cdot CW_{4,0}+P_8$ | $R_6=x_4 \cdot CW_{2,0}$ | $R_4=x_4 \cdot CW_{0,0}$ | $R_2,R_3$ |
| - | $R_{10}=x_5 \cdot CW_{4,0}+P_{10}$ | $R_8=x_5 \cdot CW_{2,0}$ | $R_6=x_5 \cdot CW_{0,0}$ | $R_4,R_5$ |
| - | $R_{12}=x_6 \cdot CW_{4,0}+P_{12}$ | $R_{10}=x_6 \cdot CW_{2,0}$ | $R_8=x_6 \cdot CW_{0,0}$ | $R_6,R_7$ |

| $AACC[12] | $AACC[8] | $AACC[4] | $AACC[0] | $aDstO |
|---|---|---|---|---|
| $R_0=x_0 \cdot CW_{6,0}+P_0$ | - | - | - | - |
| $R_2=x_1 \cdot CW_{6,0}+P_2$ | $R_0=x_1 \cdot CW_{4,0}$ | - | - | - |
| $R_4=x_2 \cdot CW_{6,0}+P_4$ | $R_2=x_2 \cdot CW_{4,0}$ | $R_0=x_2 \cdot CW_{2,0}$ | - | - |
| $R_6=x_3 \cdot CW_{6,0}+P_6$ | $R_4=x_3 \cdot CW_{4,0}$ | $R_2=x_3 \cdot CW_{2,0}$ | $R_0=x_3 \cdot CW_{0,0}$ | - |
| $R_8=x_4 \cdot CW_{6,0}+P_8$ | $R_6=x_4 \cdot CW_{4,0}$ | $R_4=x_4 \cdot CW_{2,0}$ | $R_2=x_4 \cdot CW_{0,0}$ | $R_0,R_1$ |
| $R_{10}=x_5 \cdot CW_{6,0}+P_{10}$ | $R_8=x_5 \cdot CW_{4,0}$ | $R_6=x_5 \cdot CW_{2,0}$ | $R_4=x_5 \cdot CW_{0,0}$ | $R_2,R_3$ |
| $R_{12}=x_6 \cdot CW_{6,0}+P_{12}$ | $R_{10}=x_6 \cdot CW_{4,0}$ | $R_8=x_6 \cdot CW_{2,0}$ | $R_6=x_6 \cdot CW_{0,0}$ | $R_4,R_5$ |

FIG. 14B

LOAD-STORE INSTRUCTION FOR PERFORMING MULTIPLE LOADS, A STORE, AND STRIDED INCREMENT OF MULTIPLE ADDRESSES

TECHNICAL FIELD

The present disclosure relates to a form of load-store instruction with high semantic density.

BACKGROUND

There has been increasing interest in developing processors designed for specific applications, such as graphics processing units (GPUs) and digital signal processors (DSPs). Another type application-specific processor which has gained interest recently is one dedicated to machine intelligence applications, dubbed by the applicant as an "IPU" (intelligence processing unit). These may be employed for example as accelerator processors arranged to perform work allocated by a host, such as to train or assist in training a knowledge model such as a neural network, or to perform or assist in performing predictions or inferences based on such a model.

A machine intelligence algorithm is based around performing iterative updates to a "knowledge model", which can be represented by a graph of multiple interconnected nodes. Each node represents a function of its inputs. Some nodes receive the inputs to the graph and some receive inputs from one or more other nodes, whilst the output of some nodes form the inputs of other nodes, and the output of some nodes provide the output of the graph (and in some cases a given node may even have all of these: inputs to the graph, outputs from the graph and connections to other nodes). Further, the function at each node is parameterized by one or more respective parameters, e.g. weights. During a learning stage the aim is, based on a set of experiential input data, to find values for the various parameters such that the graph as a whole will generate a desired output for a range of possible inputs. Various algorithms for doing this are known in the art, such as a back propagation algorithm based on stochastic gradient descent. Over multiple iterations based on the input data, the parameters are gradually tuned to decrease their errors, and thus the graph converges toward a solution. In a subsequent stage, the learned model can then be used to make predictions of outputs given a specified set of inputs or to make inferences as to inputs (causes) given a specified set of outputs.

A processor designed for machine intelligence applications may include dedicated instructions in its instruction set for performing arithmetic operations commonly employed in machine intelligence applications (the instruction set being the fundamental set of machine code instruction types which the execution unit of the processor is configured to recognize, each type defined by a respective opcode and zero or more operands). For instance, a common operation required in machine intelligence applications such as neural networks is the convolution of a kernel over a set of input data, where the kernel represents the weights of a node in the neural network. To perform the convolution of a significantly sized kernel over the data, the convolution may be broken down into multiple vector or matrix products each outputting a partial sum to be accumulated with the output of subsequent products. Processors already exist which include in their instruction set arithmetic instructions dedicated to performing vector and matrix multiplication type operations for use in performing convolutions.

SUMMARY

These kinds of arithmetic instructions contain a high amount of semantic content in a single instruction (i.e. perform a large amount of logic per instruction), compared to simpler, more traditional types of arithmetic instruction such as add, multiply, etc. However, to accompany such complex instructions or operations it would be desirable to also provide, in the instruction set, a load-store instruction that also contains a high concentration of semantic information in a single instruction.

According to one aspect disclosed herein, there is provided a processor comprising an execution unit, memory, and one or more register files comprising a plurality of registers, the execution unit being configured to execute instances of instructions from an instruction set defining types of machine code instructions, each of the machine code instructions consisting of an opcode and zero or more operands. The execution unit comprises a load-store unit, and the types of instruction defined in the instruction set include a load-store instruction having operands specifying, from amongst the registers in at least one of the one or more register files, a respective destination of each of two load operations, a respective source of a store operation, and a pair of address registers arranged to hold three memory addresses, the three memory addresses being a respective load address for each of the two load operations and a respective store address for the store operation. The load-store instruction further includes three stride operands each specifying a respective stride value for each of the two load addresses and the store address, wherein at least some possible values of each stride operand specify the respective stride value by specifying one of a plurality of fields within a stride register in one of the one or more register files, each field holding a different stride value. The load-store unit is configured so as, in response to the opcode of the load-store instruction, to load a respective portion of data from the memory from each of the two load addresses into the respective destination of the respective load operation, to store a respective portion of data from the source of the store operation into a location in said memory identified by the store address, and following each of the load and store operations to increment the respective address by the respective stride value (i.e. the load-store unit is configured so as, for at least some possible values of each immediate stride operand, to take the respective stride value from one of a plurality of fields within in a stride register, the field being specified by the value of the immediate stride operand).

This load-store instruction advantageously enables to stream input data from memory and stream results back into memory at a high rate with low code overhead (high code density). For instance this may be used to stream the inputs and outputs of the arithmetic operations to and from memory at the same rate as they are being consumed and output, respectively, by the arithmetic instructions, with a relatively low overhead of instructions needed for this purpose. This can be useful for example in machine learning applications to accompany matrix multiplication or accumulating matrix multiplication instructions used to perform convolution of weights with input data.

Note however that the applicability of the disclosed load-store instruction is not limited to such applications. A load-store type instruction with such semantic content may also find applications other than just machine learning, performing convolutions or matrix multiplications, such as in other sequences of complex arithmetic instructions.

In embodiments, the load-store instruction may further comprise a stride register operand for specifying the stride register from amongst a plurality of possible registers in one of the one or more register files.

In embodiments, for each of the stride operands, one possible value of the respective stride operand may specify a stride value of one unit, and a plurality of other possible values of the respective stride operand may specify different ones of the fields in the stride register.

I.e. the load-store unit is configured so as, for at least some possible values of each immediate stride operand, to set the respective stride value to one unit, rather than take the stride value from a field of the stride register (where one unit means 1 atom, i.e. the size of data access, which is not necessarily one byte—e.g. if the operand is a 4-element vector of 16-bit floating-point values, the increment is by 1 atom/unit, which is equivalent to 8-bytes, =64-bits). For some or all of the others, it takes the respective stride value from one of the fields in the stride register as specified by the value of the immediate stride operand.

In embodiments, the processor may comprise three ports to the load-store unit from the one or more register files including the pair address registers and the stride register, and the load-store unit may be configured to use a respective one of the ports for each of the pair of address registers and one of the ports to access the stride register.

In embodiments, each of the three ports has a bit-width equal to a bit width of the respective address register or stride register it is used to access.

In embodiments the processor comprises only these three ports to the load-store unit from the register file or files in question (shared among the contexts in the case of a multithreaded processor). In embodiments the pair of address registers and stride registers may be in the same register file. In embodiments the address and stride registers may all have the same bit width. In embodiments this width may be 32-bits.

In embodiments, each of the pair of address registers may be 32 bits wide, and each of the load and store addresses may be 21 bits wide.

In embodiments, the destination of each of the loads may be a pair of 32-bit wide registers, and the source of the store may be a pair of 32-bit wide registers.

In embodiments the processor may comprise two ports for performing loading from the memory, and one port for performing the storing to said memory. In embodiments the processor may comprise only these two ports for loading from the memory and only this one port for storing to the memory (shared among the contexts in the case of a multithreaded processor). In embodiments each of these ports is 64-bits wide. In embodiments the portion of data loaded by each of said loads is 64-bits wide, and the portion of data stored by said store is 64-bits wide.

In embodiments the portion of data loaded by each of said loads may consist of a pair of 32-bit floating point values or a four-element vector of 16-bit floating point values, and the portion of data stored by said store may consist of a pair of 32-bit floating point values.

In embodiments, the types of instruction defined in the instruction set may further include an arithmetic instruction which takes operands specifying, from amongst the registers in at least one of the one or more register files, sources from which to receive a first input and a second input and a destination to which to a output a result. The processor may be programmed to run a program comprising a series of instructions comprising instances of the load-store instruction and instances of the arithmetic instruction, wherein the sources of at least some of the instances of the load-store instruction may be set as the destinations of at least some of the instances of the arithmetic instruction and the destinations of at least some of the instances of the load-store instruction may be set as the sources of at least some of the instances of the arithmetic instruction.

In embodiments, said series may comprise a series of instruction pairs, each instruction pair consisting of an instance of the load-store instruction and a corresponding instance of the arithmetic instruction. In each instruction pair, the source of the instance of the load-store instruction may be set as the destination of the instance of the arithmetic instruction from a preceding one of the pairs, and the destinations of the instance of the load-store instruction may be set as the sources of the instance of the arithmetic instruction in the current or a subsequent one of said pairs.

In embodiments, each of the inputs and the result may comprise at least one floating point value, wherein the execution unit comprises a floating point arithmetic unit configured to perform arithmetic operations in response to the opcodes of the instances of the arithmetic instruction.

In embodiments, at least one of the instances of the arithmetic instruction may be one of: a vector dot product instruction, accumulating vector dot product instruction, matrix product instruction, accumulating matrix product instruction, or convolution instruction.

In embodiments, each of the instructions pairs may be an instruction bundle to be executed simultaneously; and the processor may be divided into two parallel pipelines, a first of which comprises the load-store unit arranged to execute the instance of the load-store instruction of each bundle, and a second of which comprises the floating point arithmetic unit arranged to execute the corresponding instance of the arithmetic instruction in parallel.

In embodiments, the arithmetic instruction may be an accumulating matrix product instruction for multiplying an N-element input vector with an M×N matrix of M kernels, each of the M kernels also being an N-element vector, wherein the accumulating matrix product instruction further takes an immediate operand specifying a phase from amongst a number N1 of successive phases. In this case, the series of instructions may comprise a sequence repeating in a loop, the sequence repeating in the loop comprising a sequence of N1 of said instructions pairs, wherein an instance of the accumulating matrix product instruction in each successive pair in the sequence repeating in the loop has a different value of the phase operand specifying a different successive phase of the sequence repeating in the loop, from an initial phase to an $N1^{th}$ phase. In each phase the first input is a respective subvector of an input vector for the respective iteration of the loop and the second input is a respective set of one or more partial sums, the number of elements in each input subvector being $N2=N/N1$, and the number of partial sums in each set being $Np=M/N1$, each instance of the accumulating matrix product instruction specifying an arithmetic operation in a phase of an iteration of the loop. In such embodiments, said arithmetic operation in each phase of each iteration of the loop may comprise:

copying the respective set of Np partial sums from the second input of the respective instance of the accumulating matrix product instruction into a temporary propagator state for use in the next iteration of the loop;

for each of the M kernels, performing a dot product of the respective input subvector of the current phase with a respective N2-element subvector of the kernel, thereby producing a corresponding intermediate result for each of the M kernels;

if the phase operand of the respective instance of the accumulating matrix product instruction specifies the initial phase, adding the corresponding partial product from the previous iteration loop to each of the M intermediate results;

for each of the M kernels, adding the corresponding intermediate result to each of M elements of an accumulator state; and outputting a respective subset of Np of the elements of the accumulator state from a current or a previous iteration of the loop as output results to the destination of the respective instance of the accumulating matrix product instruction.

Embodiments thus enable the multiplication of a N-element input vector with an M×N matrix once per loop, while streaming the inputs and outputs to and from memory at the same rate, with only M instructions per loop. For instance, in embodiments M=8, N=16, N1=4, N2=4 and Np=2.

The propagation state and accumulator states may be internal states of the logic of the arithmetic unit, or alternatively they could be implemented as registers in one of the register files, or a combination In embodiments, the program may comprise a warm-up period of at least two of said iterations of the loop before generating useable output results.

In embodiments, the processor may be programmed to use the sequence repeating in the loop to perform a convolution. In this case, the input vector in each iteration of the loop may represent a different sample of a portion of input data, and results from earlier iterations of the loop may be used as the partial sums for later iteration of the loop.

In embodiments, the portion of input data may comprise a three dimensional (3D) volume of data, and each of said M kernels may represent a one dimensional (1D) constituent part of a corresponding one of M larger 3D kernels. In this case, the results from earlier iterations of the loop may be used as at least one of the sets of partial sums for later loops so as to build a convolution of each 3D kernel with input data from the corresponding one dimensional constituent parts.

In embodiments, each of the 3D kernels may represent a set of weights of a node in a neural network.

In embodiments, each value of M may represent the convolution of a different feature with the input data.

In embodiments, each element of the input vector may be a 16-bit floating point value, and each element of each kernel is a 16-bit floating point value.

In alternative embodiments, each element of the input vector could for example be a 32-bit floating point value, and each element of each kernel could be a 32-bit floating point value.

In embodiments, each of the Np output results may be a 32-bit floating point value.

In alternative embodiments, the output result could instead for example be 16-bit floating-point values.

In embodiments, the one or more register files may comprise a first register file and a separate second register file, wherein the address registers are registers in the first register file, and the source and destinations of the load-store instruction are registers in the second register file.

In embodiments, the stride register may be a register in the first register file.

In embodiments, the sources and destination of the arithmetic instruction may be registers in the second register file.

In embodiments the processor may comprise three ports from the first register file to the load-store unit, and one port from the second register file to the load-store unit. In embodiments each of these three ports from the first register file to the load-store unit may be 32-bits wide. In embodiments the one port from the second register file to the load-store unit may be 64-bits wide. In embodiments the processor may comprise only these three ports from the first register file to the load-store unit, and only this one port from the second register file to the load-store unit.

In embodiments the processor may comprise two ports from the second register file to the arithmetic unit. In embodiments each of these two ports may be 64-bits wide. In embodiments the processor may comprise only these two ports from the second register file to the arithmetic unit (meaning only two ports shared amongst all the contexts in the case of a multithreaded processor).

With the parameters set out above, each load-store instruction can load two 32-bit partial sums and four 16-bit elements of the input vector per couplet, and hence the eight 32-bit partial sums and sixteen 16-bit elements of the input vector per loop of the sequence of 4 couplets (four couplets per loop). Each load-store instruction can also store two 32-bit partial sums per couplet, and hence the eight 32-bit partial sum outputs per loop of the sequence of 4 couplets. This enables the performance of the sixteen-element input vector with the eight-by-sixteen matrix once per loop, while streaming the inputs and outputs to and from memory at the corresponding rate, with a code overhead of only four load-store and four arithmetic instruction instances per loop.

In embodiments, the register files may further comprise a third register file separate from the first and second register files, and the kernels may be held in the third file.

The first register file may be a memory address register file for holding memory addresses and address offsets such as strides. The second register file may be an arithmetic register file for holding input and output operands of arithmetic operations. The third register file may be a weights register file for holding weights, e.g. of a neural network.

According to another aspect of the present invention, there is provided computer program embodied on computer-readable storage, comprising code configured to run on the processor of any embodiment above or elsewhere herein, wherein the code comprises one or more instances of the load-store instruction.

In embodiments the program may be further configured to operate in accordance with any of the configurations disclosed herein. For instance in embodiments the program may comprise one or more instances of the arithmetic instruction. The program may comprise instances of the arithmetic instruction interspersed with instances of the load-store instruction. The program may comprise the above-mentioned series of instructions, e.g. the looping sequence.

According to another aspect disclosed herein there is provided method of operating a processor configured according to any embodiment above or elsewhere herein, the method comprising running a program comprising one or more instances of the load-store instruction on the processor through the execution unit.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

Figure 1:
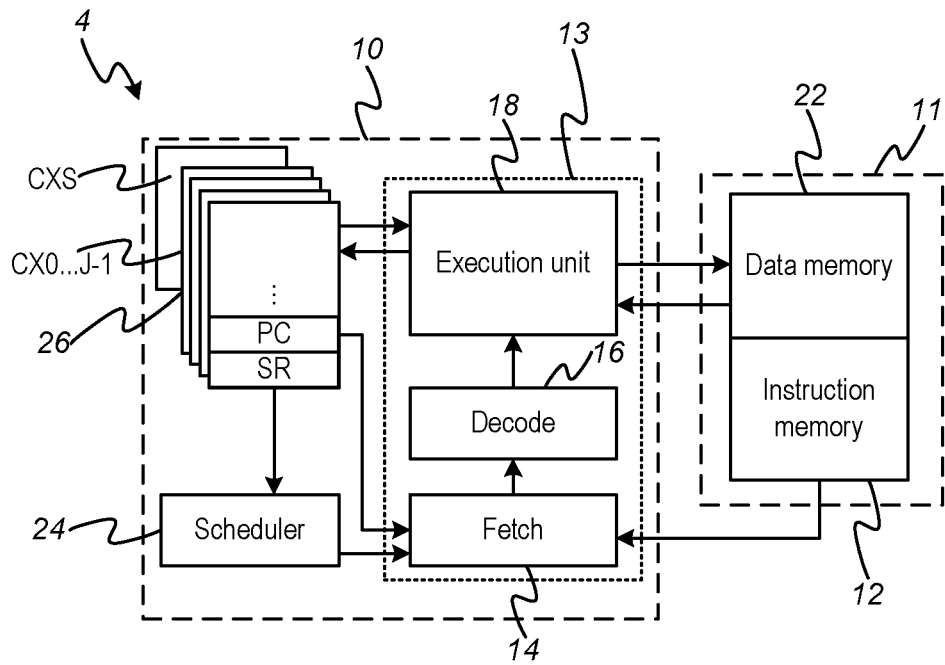
FIG. 1 is a schematic block diagram of an example multi-threaded processor.

FIG. 1 illustrates an example of a processor 4 in accordance with embodiments of the present disclosure. The processor 4 comprises a multi-threaded processing unit 10 in the form of a barrel-threaded processing unit, and a local memory 11 (i.e. on the same tile in the case of a multi-tile array, or same chip in the case of a single-processor chip). A barrel-threaded processing unit is a type of multi-threaded processing unit in which the execution time of the pipeline is divided into a repeating sequence of interleaved time slots, each of which can be occupied by a given thread. This may also be referred to as concurrent execution, discussed in more detail shortly. The memory 11 comprises an instruction memory 12 and a data memory 22 (which may be implemented in different addressable memory units or different regions of the same addressable memory unit). The instruction memory 12 stores machine code to be executed by the processing unit 10, whilst the data memory 22 stores both data to be operated on by the executed code and data output by the executed code (e.g. as a result of such operations).

The memory 12 stores a plurality of different threads of a program, each thread comprising a respective sequence of instructions for performing a certain task or tasks. Note that an instruction as referred to herein means a machine code instruction, i.e. an instance of one of the fundamental instructions of the processor's instruction set, consisting of a single opcode and zero or more operands. In embodiments the program comprises a plurality of worker threads, and a supervisor subprogram which may be structured as one or more supervisor threads. These will be discussed in more detail shortly.

A multi-threaded processor is a processor which is capable of executing multiple program threads alongside one another, typically in a concurrent manner. Concurrent execution means the threads share a common execution pipeline (or at least a common part of a pipeline) and different threads are interleaved through this same, shared execution pipeline in different interleaved time slots in a repeating cycle. This increases performance due to increased opportunities for hiding pipeline latency. The processor comprises some hardware that is common to the multiple different threads (e.g. a common instruction memory, data memory and/or execution unit); but to support the multi-threading, the processor also comprises some dedicated hardware specific to each thread.

The dedicated hardware comprises a separate set of context registers 26 for at least each of the threads that can be executed concurrently, i.e. one set per slot in the cycle. A "context", when talking about multi-threaded processors, refers to the program state of a respective one of the threads being executed alongside one another (e.g. program counter value, status and current operand values). The context registers refer to the respective registers for representing this program state of the respective thread. Registers in a register file are distinct from general memory in that register addresses are fixed as bits in instruction words, whereas memory addresses can be computed by executing instructions.

Within the processing unit 10, multiple different ones of the threads from the instruction memory 12 can be interleaved through a single execution pipeline 13 (though typically only a subset of the total threads stored in the instruction memory can be interleaved at any given point in the overall program). The multi-threaded processing unit 10 comprises a plurality of sets of context registers 26, each set 26 arranged to represent the state (context) of a different respective one of the threads that can be executed concurrently. The multi-threaded processing unit 10 also comprises a shared execution pipeline 13 that is common to the concurrently executed threads, and a scheduler 24 for scheduling the concurrent threads for execution through the shared pipeline in an interleaved manner, e.g. in a round robin manner. The processing unit 10 is connected to a shared instruction memory 12 common to the plurality of threads, and a shared data memory 22 that is again common to the plurality of threads.

The execution pipeline 13 comprises a fetch stage 14, a decode stage 16, and an execution stage 18 comprising an execution unit which may perform arithmetic and logical operations, address calculations, load and store operations, and other operations, as defined by the instruction set architecture.

Each set of context registers 26 comprises a respective one or more control registers comprising at least a program counter (PC) for the respective thread (for keeping track of the instruction address at which the thread is currently executing), and in embodiments also a set of one or more control state registers (CSRs) recording a current status of the respective thread (such as whether it is currently running or paused). Each set of context register files 26 also comprises a respective set of operand registers, for temporarily holding operands of the instructions executed by the respective thread, i.e. values operated upon or resulting from operations defined by the opcodes of the respective thread's instructions when executed. Each set of registers 26 may be implemented in one or more register files.

The fetch stage 14 has access to the program counter (PC) of each of the contexts. For each respective thread, the fetch stage 14 fetches the next instruction of that thread from the next address in the program memory 12 as indicated by the program counter. The program counter automatically increments each execution cycle unless branched by a branch instruction. The fetch stage 14 then passes the fetched instruction to the decode stage 16 to be decoded, and the decode stage 16 then passes an indication of the decoded instruction to the execution unit 18 along with the decoded addresses of any operand registers specified in the instruction, in order for the instruction to be executed. The execution unit 18 has access to the operand registers and the control state registers, which it may use in executing the instruction based on the decoded register addresses, such as in the case of an arithmetic instruction (e.g. by adding, multiplying, subtracting or dividing the values in two operand registers and outputting the result to another operand register of the respective thread). Or if the instruction defines a memory access (load or store), the load/store logic of the execution unit 18 loads a value from the data memory into an operand register of the respective thread, or stores a value from an operand register of the respective thread into the data memory 22, in accordance with the instruction.

The fetch stage 14 is connected so as to fetch instructions to be executed from the instruction memory 12, under control of the scheduler 24. The scheduler 24 is configured to control the fetch stage 14 to fetch an instruction from each of a set of concurrently executing threads in turn in a repeating sequence of time slots, thus dividing the resources of the pipeline 13 into a plurality of temporally interleaved time slots, as will be discussed in more detail shortly. For example the scheduling scheme could be round-robin or weighted round-robin. Another term for a processor operating in such a manner is a barrel threaded processor.

Figure 2:
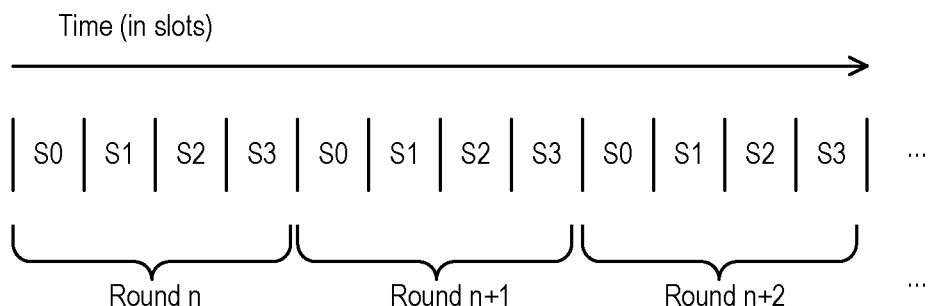
FIG. 2 schematically illustrates a scheme of interleaved time slots.

An example of the interleaving scheme implemented by the scheduler 24 is illustrated in FIG. 2. Here the concurrent threads are interleaved according to a round-robin scheme whereby, within each round of the scheme, the round is divided into a sequence of time slots S0, S1, S2 . . . SJ−1 (e.g. J=4, or J=6), each slot for executing a respective thread. Typically each slot is one execution cycle long and the different slots are evenly sized, though not necessarily so in all possible embodiments, e.g. a weighted round-robin scheme is also possible whereby some threads get more cycles than others per execution round. In general the barrel-threading may employ either an even round-robin or a weighted round-robin schedule, where in the latter case the weighting may be fixed or adaptive.

Whatever the sequence per execution round, this pattern then repeats, each round comprising a respective instance of each of the time slots. Note therefore that a time slot as referred to herein means the repeating allocated place in the sequence, not a particular instance of the time slot in a given repetition of the sequence. Put another way, the scheduler 24 apportions the execution cycles of the pipeline 13 into a plurality of temporally interleaved (time-division multiplexed) execution channels, with each comprising a recurrence of a respective time slot in a repeating sequence of time slots. In the illustrated embodiment, there are four time slots, but this is just for illustrative purposes and other numbers are possible. E.g. in one preferred embodiment there are in fact six time slots.

In embodiments, the context registers 26 comprises a respective set of worker context registers CX0 . . . CX(J−1) for each of the number J of threads that can be executed concurrently (J=3 in the example illustrated but this is not limiting), and one additional supervisor context register file CXS. The worker context register files holds the contexts of worker threads, and the supervisor context register file holds the context of a supervisor thread. Note that in embodiments the supervisor context has a different number of registers than each of the workers. The processing unit 10 thus comprises one more context register file 26 than there are time slots, i.e. it supports one more context than the number of interleaved timeslots it is capable of barrel-threading.

Each of the worker contexts CX0 . . . CXJ is used to represent the state of a respective one of a plurality of worker threads currently assigned to one of the four execution time slots S0 . . . SJ, for performing whatever application-specific computation tasks are desired by the programmer (note again this may only be subset of the total number of worker threads of the program as stored in the instruction memory 12). The additional context CXS is used to represent the state of a "supervisor thread" (SV) whose role it is to coordinate the execution of the worker threads, at least in the sense of assigning which of the worker threads W is to be executed in which of the time slots S0, S1, S2 . . . at what point in the overall program. Optionally the supervisor thread may have other "overseer" or coordinating responsibilities, such as performing external exchanges or barrier synchronisations. Note of course that the illustrated case of J=4 is just one example implementation for illustrative purposes. E.g. in another implementation J=6 (six time slots, six worker contexts and one supervisor context).

Figure 3:
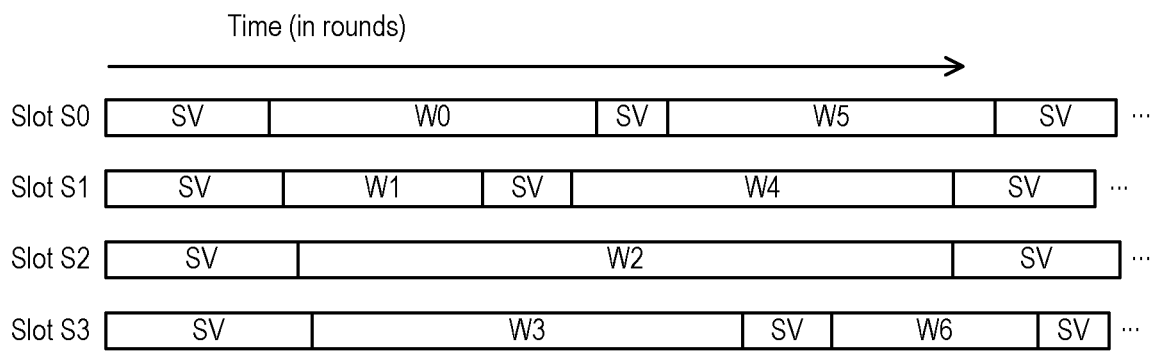
FIG. 3 schematically illustrates a supervisor thread and a plurality of worker threads running in a plurality of interleaved time slots.

Referring to FIG. 3, in embodiments the supervisor thread SV does not have its own time slot per se in the scheme of interleaved execution time slots. Nor do the workers as allocation of slots to worker threads is flexibly defined. Rather, each time slot has its own set of context registers for storing worker context, which is used by the worker when the slot is allocated to the worker, but not used when the slot is allocated to the supervisor. When a given slot is allocated to the supervisor, that slot instead uses the context register file CXS of the supervisor. The supervisor always has access to its own context and no workers are able to occupy the supervisor context register file CXS.

The supervisor thread SV has the ability to run in any and all of the time slots S0 . . . S3 (or more generally S0 . . . SJ−1). The scheduler 24 is configured so as, when the program as a whole starts, to begin by allocating the supervisor thread to all of the time slots, i.e. so the supervisor SV starts out running in all of S0 . . . SJ−1. However, the supervisor thread is provided with a mechanism for, at some subsequent point (either straight away or after performing one or more supervisor tasks), temporarily relinquishing each of the slots in which it is running to a respective one of the worker threads, e.g. initially workers W0 . . . W3 in the example shown in FIG. 3 (or more generally W0 . . . WJ−1). This is achieved by the supervisor thread executing a run instruction, which takes at least address of a worker thread in the instruction memory 12 as an operand. The worker threads are portions of code that can be run concurrently with one another, each representing one or more respective computation tasks to be performed.

The run instruction acts on the scheduler 24 so as to relinquish the current time slot, in which this instruction is itself executed, to the worker thread specified by the operand. Note that it is implicit in the run instruction that it is the time slot in which this instruction is executed that is being relinquished (implicit in the context of machine code instructions means it doesn't need an operand to specify this—it is understood implicitly from the opcode itself). Thus the time slot which is given away is the time slot in which the supervisor executes the run instruction.

The supervisor thread SV performs a similar operation in each of one or more others of the time slots, to give away some or all of its time slots to different respective ones of the worker threads W0 ... WJ-1 (selected from a larger set of possible worker threads in the instruction memory 12). Once it has done so for the last slot, the supervisor is suspended (then later will resume where it left off when one of the slots is handed back by a worker W). The supervisor thread SV is thus able to allocate different worker threads, each performing one or more tasks, to different ones of the interleaved execution time slots S0 ... SJ-1 (e.g. J=4 as illustrated, or J=6). When the supervisor thread determines it is time to run a worker thread, it uses the run instruction to allocate this worker to the time slot in which the run instruction was executed.

In some embodiments, the instruction set also comprises a variant of the run instruction, "run-all". This instruction is used to launch a set of more than one worker together, all executing the same code. In embodiments this launches a worker in every one of the processing unit's slots S0 ... S3 (or more generally S0 ... S(J-1)).

Once launched, each of the currently allocated worker threads W0 ... WJ-1 proceeds to perform the one or more computation tasks defined in the code specified by the respective run instruction. At the end of this, the respective worker thread then hands the time slot in which it is running back to the supervisor thread. This is achieved by executing an exit instruction in the respective worker thread. The exit instruction acts on the scheduler 24 so as to pass back the current time slot, in which this instruction is itself executed, to the supervisor thread. In response the scheduler 24 then continues running the supervisor in that slot.

Figure 4:
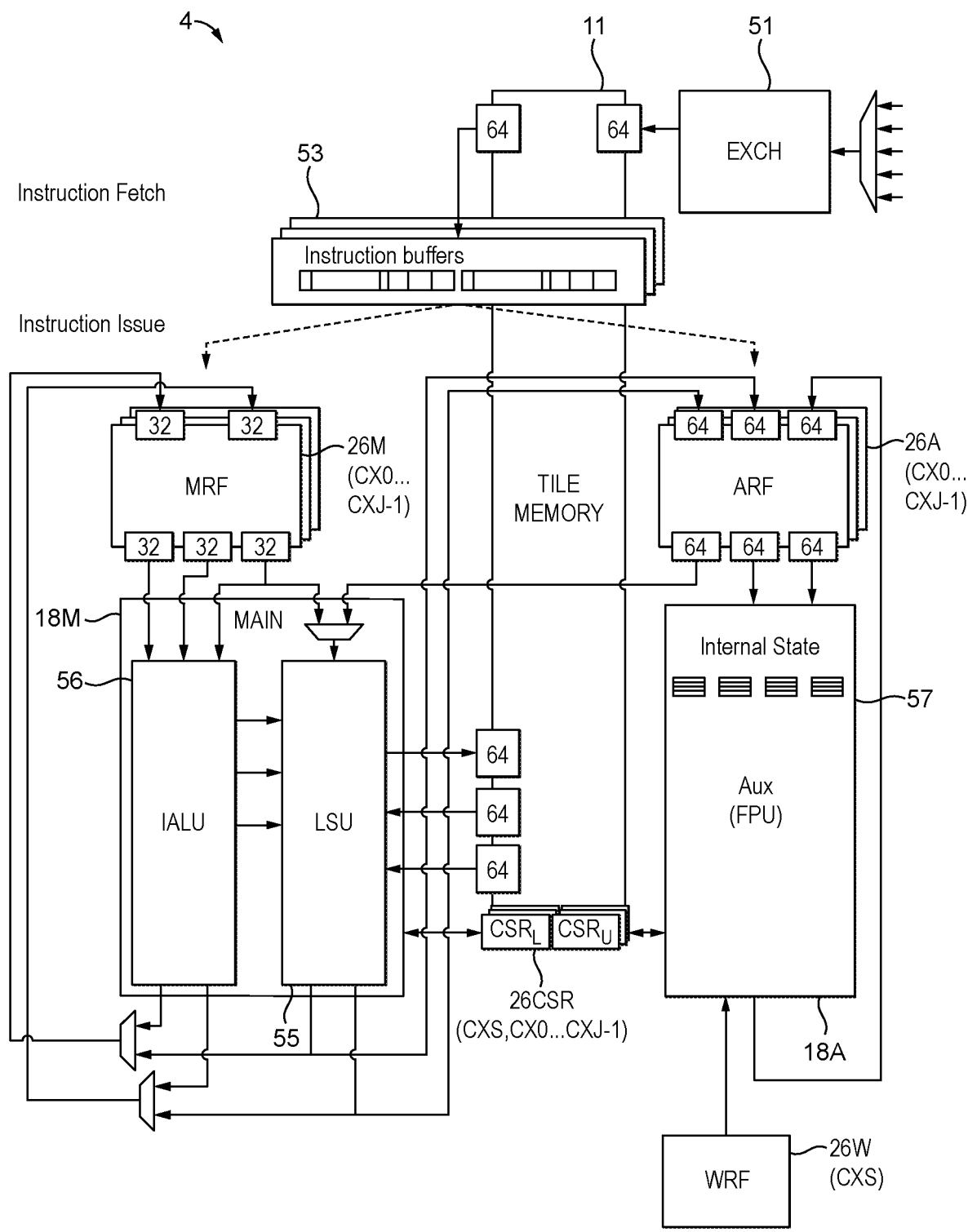
FIG. 4 is a schematically illustrates a logical block structure of an example processor.

FIG. 4 illustrates further example details of the processor 4 including detail of the execution unit 18 and context registers 26. The processor comprises a respective instruction buffer 53 for each of the M threads capable of being executed concurrently. The context registers 26 comprise a respective main register file (MRF) 26M for each of the worker M contexts and the supervisor context. The context registers further comprise a respective auxiliary register file (ARF) 26A for at least each of the worker contexts. The context registers 26 further comprise a common weights register file (WRF) 26W, which all the currently executing worker thread can access to read from. The WRF may be associated with the supervisor context in that the supervisor thread is the only thread that can write to the WRF. The context registers 26 may also comprise a respective group of control state registers 26CSR for each of the supervisor and worker contexts. The execution unit 18 comprises a main execution unit 18M and an auxiliary execution unit 18A. The main execution unit 18M comprises a load-store unit (LSU) 55 and an integer arithmetic logic unit (IALU) 56. The auxiliary execution unit 18A comprises at least a floating point arithmetic unit (FPU).

In each of the J interleaved time slots S0 ... SJ-1, the scheduler 24 controls the fetch stage 14 to fetch at least one instruction of a respective thread from the instruction memory 11, into the respective one of the J instruction buffers 53 corresponding to the current time slot. In embodiments each time slot is one execution cycle of the processor, though other schemes are not excluded (e.g. weighted round-robin). In each execution cycle of the processor 4 (i.e. each cycle of the processor clock which clocks the program counter) the fetch stage 14 fetches either a single instruction or a small "instruction bundle" (e.g. a two-instruction bundle or four-instruction bundle), depending on implementation. Each instruction is then issued, via the decode stage 16, into one of the LSU 55 or IALU 56 of the main execution unit 18M or the FPU of the auxiliary execution unit 18A, depending on whether the instruction (according to its opcode) is a memory access instruction, an integer arithmetic instruction or a floating point arithmetic instruction, respectively. The LSU 55 and IALU 56 of the main execution unit 18M execute their instructions using registers from the MRF 26M, the particular registers within the MRF 26M being specified by operands of the instructions. The FPU of the auxiliary execution unit 18A performs operations using registers in the ARF 26A and WRF 26W, where the particular registers within the ARF are specified by operands of the instructions. In embodiments the registers in the WRF may be implicit in the instruction type (i.e. pre-determined for that instruction type). The auxiliary execution unit 18A may also contain circuitry in the form of logical latches internal to the auxiliary execution unit 18A for holding some internal state 57 for use in performing the operations of one or more of the types of floating point arithmetic instruction.

In embodiments that fetch and execute instructions in bundles, the individual instructions in a given instruction bundle are executed simultaneously, in parallel down independent pipelines 18M, 18A (shown in FIG. 4). In embodiments that execute bundles of two instructions, the two instructions may be executed simultaneously down respective auxiliary and main pipelines. In this case, the main pipeline is arranged to execute types of instruction that use the MRF and the auxiliary pipeline is used to execute types of instruction that use the ARF. The pairing of instructions into suitable complementary bundles may be handled by the compiler.

Each worker thread context has its own instance of the main register file (MRF) 26M and auxiliary register file (ARF) 26A (i.e. one MRF and one ARF for each of the barrel-threaded slots). Functionality described herein in relation to the MRF or ARF is to be understood to operate on a per context basis. However there is a single, shared weights register file (WRF) shared between the threads. Each thread can access the MRF and ARF of only its own context 26. However, all currently-running worker threads can access the common WRF. The WRF thus provides a common set of weights for use by all worker threads. In embodiments only the supervisor can write to the WRF, and the workers can only read from the WRF.

The instruction set of the processor 4 includes at least one type of load instruction whose opcode, when executed, causes the LSU 55 to load data from the data memory 22 into the respective ARF, 26A of the thread in which the load instructions was executed. The location of the destination within the ARF is specified by an operand of the load instruction. Another operand of the load instruction specifies an address register in the respective MRF, 26M, which holds a pointer to an address in the data memory 22 from which to load the data. The instruction set of the processor 4 also includes at least one type of store instruction whose opcode, when executed, cases the LSU 55 to store data to the data memory 22 from the respective ARF of the thread in which the store instruction was executed. The location of the source of the store within the ARF is specified by an operand of the store instruction. Another operand of the store instruction specifies an address register in the MRF, which holds a pointer to an address in the data memory 22 to which to store the data. In general the instruction set may include separate load and store instruction types, and/or at least one type of load-store instruction type which combines the load and store operations in a single instruction. As will be discussed in more detail shortly, the instruction set may include a particular type of load-store instruction which performs two loads and one store operation all in a single instruction. Note that the instruction set of a given processor 4 can include multiple different varieties of load, store and/or load-store instruction types.

The instruction set of the processor also includes one or more types of arithmetic instruction for performing arithmetic operations. According to embodiments disclosed herein, these may include at least one type of arithmetic instruction which makes use of the common weights register file, WRF, 26W. This type of instruction takes at least one operand which specifies at least one source of the corresponding arithmetic operation in the respective ARF, 26A, of the thread in which the arithmetic instruction was executed. However, at least one other source of the arithmetic instruction is in the common WRF, common to all the worker threads. In embodiments this source is implicit in the arithmetic instruction in question (i.e. implicit for this type of arithmetic instruction). Implicit in the sense of a machine code instruction means not requiring an operand to specify. I.e. in this case, the location of the source in the WRF is inherent from the opcode (predetermined for that particular opcode). Alternatively in other embodiments, the arithmetic instruction may take an operand specifying from which set of weight registers to take the weights, from amongst a few different sets in the WRF. However, the fact that the source of the weights is found in the WRF (as opposed to, say, the general purpose MRF or ARF) is still implicit.

In response to the opcode of the relevant type of arithmetic instruction, the arithmetic unit (e.g. FPU) in the auxiliary execution unit 18A performs an arithmetic operation, as specified by the opcode, which comprises operating upon the values in the specified source register(s) in the threads' respective ARF and the source register(s) in the WRF. It also outputs a result of the arithmetic operation to a destination register in the thread's respective ARF as specified explicitly by a destination operand of the arithmetic instruction.

Example types of arithmetic instruction that may employ a source in the common WRF, 26W, may include: one or more vector multiplication instruction types, one or more matrix multiplication instruction types, one or more accumulating vector multiplication instruction types and/or accumulating matrix multiplication instruction types (which accumulate a result of the multiplication from one instance of the instruction to the next), and/or one or more convolution instruction types. For example, a vector multiplication instruction type may multiply an explicit input vector from the ARF, 26A, with a predetermined vector of weights from the WRF; or a matrix multiplication instruction type may multiply an explicit input vector from the ARF with a predetermined matrix of weights from the WRF. As another example, a convolution instruction type may convolve an input matrix from the ARF with a predetermined matrix from the WRF. Having a shared weights register file, WRF, common to a plurality of threads, enables each thread to multiply or convolve a common kernel with its own respective data. This is useful as this is a scenario that comes up a lot in machine learning applications, e.g. where each thread represents a different node in a neural network and the common kernel represents a feature being searched or trained for (for instance an edge or particular shape in an area or volume of graphical data).

In embodiments the values in the WRF, 26W, can be written by the supervisor thread. The supervisor (which in embodiment begins by running in all the slots S0 . . . SM) first executes a series of put instructions to write the values of some commune weights into the predetermined location in the WRF. It then executes run instructions (or a run-all instruction) to launch a respective worker in some or all of the slots S0 . . . SJ−1. Each worker then includes one or more instances of one or more arithmetic instructions of the type(s) discussed above, so as to perform the corresponding arithmetic operation(s) upon their own respective input data, as loaded into their respective ARF, 26A, but using the common weights written by the supervisor into the WRF, 26W. When each thread finishes its respective task it executes an exit instruction to hand its slot back to the supervisor. When all the launched threads have finished their respective tasks, the supervisor can write new values to the WRF and launch a new set of threads (or launch a new set to continue to use the existing values in the WRF).

It will be appreciated that the labels "main", "auxiliary" and "weights" are not necessarily limiting. In embodiments they may be any first register file (per worker context), second register file (per worker context) and shared third register file (e.g. part of the supervisor context but accessible to all workers). The ARF 26A and auxiliary execution unit 18 may also be referred to as the arithmetic register file and arithmetic execution unit since they are used for arithmetic instructions (or at least the floating point arithmetic). The MRF 26M and auxiliary execution unit 18 may also be referred to as the memory address register file and arithmetic execution unit since one of their uses is for accessing memory. The weights register file (WRF) 26W is so-called because it is used to hold multiplicative weights used in a certain type or types of arithmetic instruction, to be discussed in more detail shortly. E.g. these could be used to represent the weights of nodes in a neural network. Seen another way, the MRF could be called the integer register file as it is used to hold integer operands, whilst the ARF could be called the floating-point register file as it is used to hold floating-point operands. In embodiments that execute instructions in bundles of two, the MRF is the register file used by the main pipeline and the ARF is the register used by the auxiliary pipeline.

In alternative embodiments however, note that the register space 26 is not necessarily divided into these separate register files for these different purposes. Instead instructions executed through the main and auxiliary execution units may be able to specify registers from amongst the same shared register file (one register file per context in the case of a multithreaded processor). Also the pipeline 13 does not necessarily have to comprise parallel constituent pipelines (e.g. aux and main pipelines) for simultaneously executing bundles of instructions.

Figure 5:
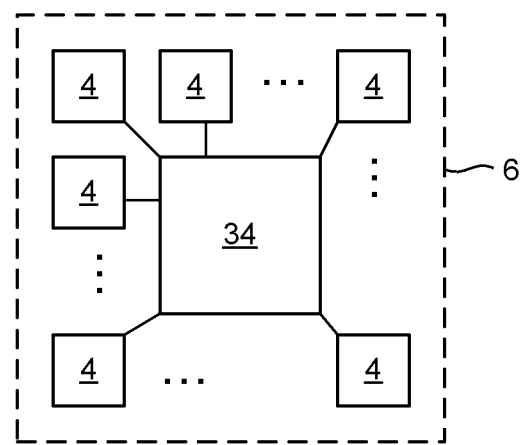
FIG. 5 is a schematic block diagram of a processor comprising an array of constituent processors.

The processor 4 may also comprise an exchange interface 51 for exchanging data between the memory 11 and one or more other resources, e.g. other instances of the processor and/or external devices such as a network interface or network attached storage (NAS) device. As illustrated in FIG. 5, in embodiments the processor 4 may form one of an array 6 of interconnected processor tiles, each tile running part of a wider program. The individual processors 4 (tiles) thus form part of a wider processor or processing system 6. The tiles 4 may be connected together via an interconnect subsystem 34, to which they connect via their respective exchange interface 51. The tiles 4 may be implemented on the same chip (i.e. die) or on different chips, or a combination (i.e. the array may be formed from multiple chips each comprising multiple tiles 4). The interconnect system 34 and exchange interface 51 may therefore comprise an internal (on-chip) interconnect mechanism and/or external (inter-chip) exchange mechanism, accordingly.

Figure 6:
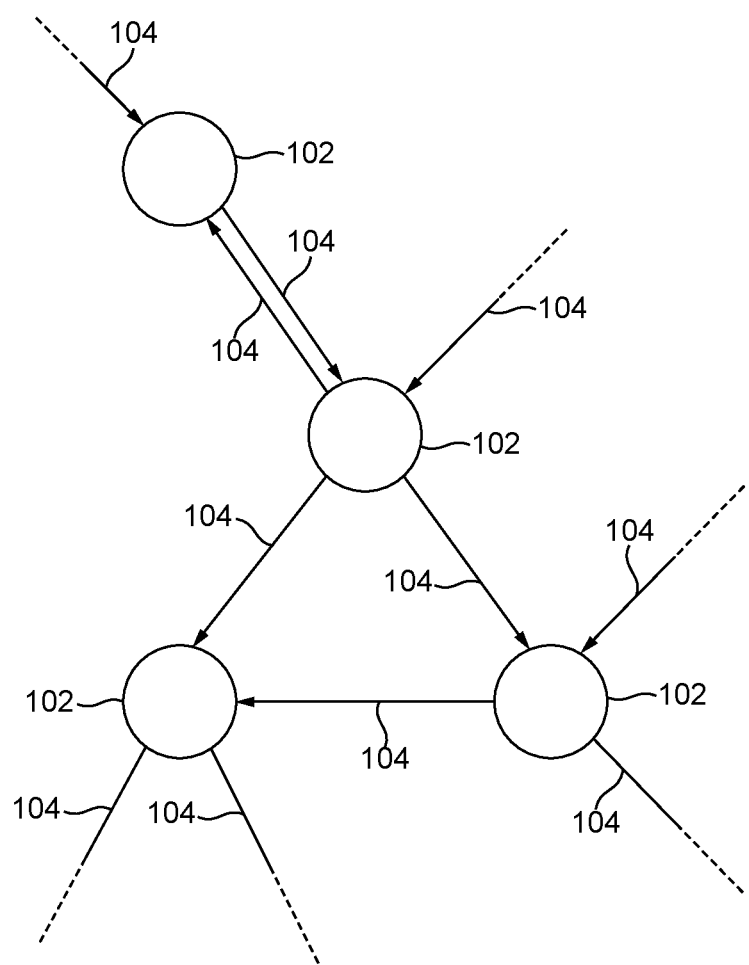
FIG. 6 is a schematic illustration of a graph used in a machine intelligence algorithm, FIG. 7 schematically illustrates an address packing scheme for use in implementing a type of load-store instruction, FIG. 8 schematically illustrates an arrangement of predetermined stride values in a set of stride registers, FIG. 9 schematically illustrates a convolution of a 3D kernel K with an input volume of data, FIG. 10 schematically illustrates a matrix multiplication performed by a sequence of phases of an accumulating matrix product instruction, FIG. 11 further illustrates the operation of the accumulating matrix product instructions, FIG. 12A-12B gives an example of a series of loops of a sequences of accumulating matrix product instructions arranged to perform a convolution, FIG. 13 schematically illustrates the operation of a convolution instruction, and FIG. 14A-14-B gives an example of a series of convolution instructions.

In one exemplary application of a multi-threaded and/or multi-tiled processor or system, the program run across the multiple threads and/or tiles 4 comprises a machine intelligence algorithm, such as an algorithm configured to train a neural network and/or to perform inference based on a neural network. In such embodiments each worker thread, or the part of the program run on each tile, or each worker thread on each tile, is used to represent a different node 102 in a neural network (a type of graph); and communications between threads and/or tiles, accordingly, represent edges 104 between nodes 102 in the graph. This is illustrated in FIG. 6.

Machine intelligence begins with a learning stage where the machine intelligence algorithm learns a knowledge model. The model comprises a graph of interconnected nodes (i.e. vertices) 102 and edges (i.e. links) 104. Each node 102 in the graph has one or more input edges and one or more output edges. Some of the input edges of some of the nodes 102 are the output edges of some others of the nodes, thereby connecting together the nodes to form the graph. Further, one or more of the input edges of one or more of the nodes 102 form the inputs to the graph as a whole, and one or more of the output edges of one or more of the nodes 102 form the outputs of the graph as a whole. Sometimes a given node may even have all of these: inputs to the graph, outputs from the graph and connections to other nodes. Each edge 104 communicates a value or more often a tensor (n-dimensional matrix), these forming the inputs and outputs provided to and from the nodes 102 on their input and output edges respectively.

Each node 102 represents a function of its one or more inputs as received on its input edge or edges, with the result of this function being the output(s) provided on the output edge or edges. Each function is parameterized by one or more respective parameters (sometimes referred to as weights, though they need not necessarily be multiplicative weights). In general the functions represented by the different nodes 102 may be different forms of function and/or may be parameterized by different parameters.

Further, each of the one or more parameters of each node's function is characterized by a respective error value. Moreover, a respective condition may be associated with the error(s) in the parameter(s) of each node 102. For a node 102 representing a function parameterized by a single parameter, the condition may be a simple threshold, i.e. the condition is satisfied if the error is within the specified threshold but not satisfied if the error is beyond the threshold. For a node 102 parameterized by more than one respective parameter, the condition for that node 102 having reached an acceptable level of error may be more complex. For example, the condition may be satisfied only if each of the parameters of that node 102 falls within respective threshold. As another example, a combined metric may be defined combining the errors in the different parameters for the same node 102, and the condition may be satisfied on condition that the value of the combined metric falls within a specified threshold, but otherwise the condition is not satisfied if the value of the combined metric is beyond the threshold (or vice versa depending on the definition of the metric). Whatever the condition, this gives a measure of whether the error in the parameter(s) of the node falls below a certain level or degree of acceptability. In general any suitable metric may be used. The condition or metric may be the same for all nodes, or different for different respective ones of the nodes.

In the learning stage the algorithm receives experience data, i.e. multiple data points representing different possible combinations of inputs to the graph. As more and more experience data is received, the algorithm gradually tunes the parameters of the various nodes 102 in the graph based on the experience data so as to try to minimize the errors in the parameters. The goal is to find values of the parameters such that the output of the graph is as close as possible to a desired output for a given input. As the graph as a whole tends toward such a state, the graph is said to converge. After a suitable degree of convergence the graph can then be used to perform predictions or inferences, i.e. to predict an outcome for some given input or infer a cause for some given output.

The learning stage can take a number of different possible forms. For instance, in a supervised approach, the input experience data takes the form of training data, i.e. inputs which correspond to known outputs. With each data point, the algorithm can tune the parameters such that the output more closely matches the known output for the given input. In the subsequent prediction stage, the graph can then be used to map an input query to an approximate predicted output (or vice versa if making an inference). Other approaches are also possible. For instance, in an unsupervised approach, there is no concept of a reference result per input datum, and instead the machine intelligence algorithm is left to identify its own structure in the output data. Or in a reinforcement approach, the algorithm tries out at least one possible output for each data point in the input experience data, and is told whether this output is positive or negative (and potentially a degree to which it is positive or negative), e.g. win or lose, or reward or cost, or such like. Over many trials the algorithm can gradually tune the parameters of the graph to be able to predict inputs that will result in a positive outcome. The various approaches and algorithms for learning a graph will be known to a person skilled in the art of machine learning.

According to an exemplary application of the techniques disclosed herein, each worker thread is programmed to perform the computations associated with a respective individual one of the nodes 102 in a machine intelligence graph such as a neural network. In this case at least some of the edges 104 between nodes 102 correspond to the exchanges of data between threads, and some may involve exchanges between tiles. In the case of a multi-tile arrangement 6 with multiple threads per tile 4, each tile 4 runs a subgraph of the graph. Each subgraph comprises a supervisor subprogram comprising one or more supervisor threads, and a set of worker threads representing the nodes 102 of the respective subgraph.

In applications such as machine intelligence, it would be desirable to be able to efficiently stream data to and from the data memory 22 of the processor 4 (e.g. tile). For instance this would be particularly (but not exclusively) useful to accompany a sequence of complex arithmetic instructions such as vector dot product instructions, matrix products, accumulating vector dot products, accumulating matrix products or dedicated convolution instructions, which pack a high degree of arithmetic complexity into a single arithmetic instruction.

To address such issues, the present disclosure provides a type of load-store instruction, in the instruction set of the processor 4, which performs two load operations and one store operation and then automatically applies an independent stride to each of the load and store addresses, all in response to a single instance of the opcode of the instruction. Furthermore the instruction uses an efficient packing of addresses in the appropriate register file (e.g. the MRF 26M), whereby the three addresses (the two load addresses and one store addresses) are packed into the space of two registers. This enables the three memory addresses and the stride register to be accessed in a single instruction with only three ports from the MRF, 26M, to the LSU (one respective port for accessing each of the three registers).

The instruction may be referred to herein as "ld2xst64pace", referring to the fact that it loads two 64-bit values and stores one 64-bit value, with "pace" being a synonym for stride. However this label or the particular bit widths are not to be taken as necessarily limiting. The instruction may more generally be referred to as just the load-store instruction (though this does not imply it is necessarily the only kind of load-store instruction in the processor's instruction set), or "ldx2st" (load times two and store). Its syntax is as follows:

ld2xst $aDst, $aSrc, $mAddr, $mStride, Strimm $aDst refers to one or more operands identifying a destination in the auxiliary (or arithmetic) register file (ARF) 26A, the destination comprising one or more of the registers in the ARF. In embodiments each of the registers in the ARF is 32-bits wide, and the destination $aDst may consist of four such 32-bit registers: $aDst0:Dst0+3. The destination operand of the ld2xst64pace may specify the location of just one of these destination registers in the ARF (e.g. the lowest $aDst0) and the locations of the other(s) may be implicit relative to this (e.g. the next three contiguous registers in the ARF). Alternatively in other implementations, it is not excluded that the multiple destination operands could each be identified explicitly and independently by separate operands (though this would require an increased instruction width).

$aSrc refers to one or more operands identifying a source in the ARF, 26A, the source comprising one or more of the registers in the ARF. In embodiments each of the registers in the ARF is 32-bits wide, and the source $aSrc may consist of two such 32-bit registers: SaSrc0:Src+1. The source operand of the ld2xst64pace may specify the location of just one of these source registers in the ARF (e.g. the lowest $aSrc0) and the location of the other(s) may be implicit relative to this (e.g. the next contiguous register in the ARF). Alternatively in other implementations, it is not excluded that the multiple source operands could each be identified explicitly and independently by separate operands (though this would require an increased instruction width).

$nnAddr refers to one or more operands specifying the location of two registers $nnAddr0:Addr0+1 in the main register file (MRF) 25M, which between them hold three addresses: two load addresses and one store address. In embodiments each of the registers in the MRF is 32-bits wide. The memory address operand may specify the location of just one of these registers in the MRF (e.g. the lowest $mAddr0), the location of the other being implicit relative to this (e.g. the next contiguous register in the MRF). Alternatively in other implementations, it is not excluded that the memory address registers could each be identified explicitly and independently by separate operands (though this would require an increased instruction width).

Strimm is a set of immediate operands, a respective one for each of the two load and one store addresses. In the MRF, 26M, there is provided a stride register which comprises a plurality of fields. Each field holds a different respective one of a predetermined set of different possible stride values. A stride value is a value by which to increment a memory address, i.e. a memory address step, typically for use in a series of such steps. For each of the two loads and one store, the respective immediate stride operand specifies from which field in the stride register to take the stride value to apply to the respective load or store address, after performing the respective load or store operation of the present instance of the instruction. This moves along the address in the MRF, 26M, for the benefit of a subsequent instance of the load-store instruction.

In embodiments, the load-store unit 55 supports a feature whereby one special value of the immediate stride operand can directly specify a stride value of 1 (i.e. an increase of one address unit in the address space used), rather than pointing to a register field. I.e. out of the range of values the immediate stride operand can take, one of the values specifies a stride of one, and some or all of the others specify different possible fields in the stride register holding programmable stride values. One unit here means the atomic size of the data access. E.g. if the operand is a 4-element vector of 16-bit floating-point values, the increment is by 1 atom/unit, which is equivalent to 8-bytes (64-bits).

The stride register is a register in the MRF, 26M. In embodiments the worker itself is responsible for writing the stride values in the fields of its own stride register (in its own MRF). Alternatively it is not excluded that in other implementations, the stride values in the fields of the stride register may be written by the supervisor thread SV, or a combination of approaches may be used.

The requirement for an operand specifying $mStride is an optional feature of the processor 4 depending on implementation. In embodiments, the load-store instruction takes an operand specifying the location of the stride register $mStride in the MRF, 26M. Thus the program is able to select the stride register from amongst a plurality of possible stride registers, providing even more flexibility in the selection of the stride. However in alternative implementations it is not excluded that the location of $mStride could be fixed or implicit and not require an operand in the load-store instruction.

FIG. 7 illustrates an example of the packing of three addresses into two 32-bit registers in the MRF, 26M, each address being 21-bits. FIG. 7 also illustrates an example of the packing of three stride values into one 32-bit register in the MRF, each stride value being 10-bits (in this case two bits of the register go unused). Thus the load-store instruction can access three memory addresses via only two 32-bit wide ports of the MRF in a single instruction. A third 32-bit wide port may be used by the same instruction to access the stride register, e.g. containing three 10-bit stride values (address deltas) in three 10-bit wide fields packed into a 32-bit wide stride register in the MRF (leaving 2 bits of that register unused). Note that the particular packing shown in FIG. 7 is just an example. E.g. in another implementation addr2 may straddle the two registers, rather than addr1.

FIG. 8 illustrates an arrangement of multiple stride registers $mStrideA, $mStrideB, $mStrideC . . . in the MRF, 26M. Any of these could be specified as the stride register $mStride by the corresponding operand of the load-store instruction. Each possible stride register comprises a plurality of fields, e.g. in embodiments three (though depending on implementation there are not necessarily the same number of fields nor stride registers as there are load and store addresses). For each of the two load and one store addresses, the respective immediate operand in the set of immediates Strimm can specify one of the possible fields in the stride register $mStride from which to take a respective stride value (an address delta to be applied following the respective load or store). For instance, in embodiments, if the stride operand is 2-bits for each of the two loads and one store, then three of the possible values specify different ones of the three stride fields, and the other possible value simply specifies a stride of one without referring to a value held in a register. E.g. 00 would specify a stride of 1 (atom), whilst 01 would specifies a first field in the stride register, 10 would specify a second field in the stride register and 11 would specify a third field in the stride register.

Note that in embodiments, one of the possible values of the stride immediate specifies a default increment of 1, rather than a field in the stride register $mStride.

In operation, when executed by the execution unit 18, the opcode of the load-store instruction (after decoding by the decode stage 16) triggers the LSU 55 to perform the following operations. It loads the values from the two load addresses in the memory 22 as specified by the address held in $mAddr in the MRF, 26M, into the destination in the ARF, 26A, specified by $aDst. Further, it stores the value(s) from $aSrc in ARF into the store address in memory 22 as specified by the address held in $mAddr in the MRF. The LSU 55 then independently post-increments each of the two load and one store addresses by the respective stride value from the field of the respective stride register $mStride in the MRF as specified by the respective one of the three immediate operands Strimm.

Note: for each of the two load and one store addresses of the current instance of the load-store instruction, the stride operation of the current instruction increments the respective address by the respective stride following each of the load and store operations of the current load-store operation, respectively. Depending on implementation, this may mean that all the increments are applied together after both the loads and the store, e.g. load, load, store, increment, increment, increment. Alternatively the stride operation may increment the respective address immediately following each load and the store, e.g. load, increment, load, increment, store, increment. Indeed the store could also come before one or both of the loads. What matters is just that the increment of each load address is done after its respective load, and the increment of the store address is done after the store. The point is to move along the load and store addresses in the MRF ready for a subsequent instance of the load-store instruction.

In embodiments the memory 11 (or at least the data memory 22) has only two 64-bit ports for loading data from memory, and only one 64-bit wide port for storing data to memory. In embodiments the MRF, 26M (of a given context) has only three 32-bit wide ports to the load-store unit 55; and the ARF, 26A (of a given context) has only one 64-bit wide port to the load-store unit 55. (Note: in the illustrated example, the IALU 56 is being used to retrieve the pointers from the MRF 26M and to compute the addresses from these in order to pass to the LSU 55, so in effect the IALU 56 is acting as part of the LSU 55. Hence in this example the three ports from the MRF 26M to the LSU 55 comprise the three ports from the MRF 26M to the IALU 56. It is also not excluded that in other implementations the LSU 55 could retrieve the pointers from the MRF 26M directly and compute its own addresses based thereon.)

In embodiments the four 32-bit destination registers $aDst0:Dst0+3 in the ARF (128 bits in total) may be used to load, from memory 22, e.g. a four-element vector of 16-bit floating point (f16) values and a two-element vector of 32-bit floating point (f32) values. The two 32-bit source registers $aSrc0:Src+1 in the ARF (64 bits in total) may be used to store, into memory 22, e.g. a two-element vector of 32-bit of f32 values.

To use in a program, the load-store instruction is interspersed amongst other types of instruction such as arithmetic instructions which take inputs from the destinations of the load instructions, perform operations based thereon, and output results to the sources of the load-store instruction. I.e. the program comprises instances of the load-store instruction and instances of at least one arithmetic instruction, such as the vector dot product instruction, matrix product instruction, accumulating vector dot product instruction, accumulating matrix product instruction or convolution instruction mentioned previously; wherein the destinations of at least some of the load-store instructions are the sources of at least some of the arithmetic instructions, and the destinations of at least some of the arithmetic instructions are the sources of at least some of the load-store instructions. Due to the high semantic density of the load-store instruction, with its two loads and stride functionality, this enables to the program efficiently work through the data with a small code overhead expended on the load and store operations.

For instance, the program may comprise a series of instruction pairs, each instruction pair consisting of an instance of the load-store instruction followed by a corresponding instance of an arithmetic instruction, or accompanied by it simultaneously in the same bundle. In each instruction pair, the source of the load-store instruction is set as the destination of the arithmetic instruction from a preceding pair, and the destinations of the load-store instruction are set as the sources of the arithmetic instruction in the current or a subsequent pair. For instance consider an arithmetic instruction "arith" having the syntax:

arith $aDst, $aSrcA, $aSrcB where $aDst refers to an operand specifying a destination in the ARF, 26A; and $aSrcA, $aSrcB refer to operands specifying two sources in the ARF (it will be appreciate that "arith" is a generic name used here for any arithmetic instruction having at least this syntax). The program may then be programmed with a series of instruction pairs, for instance:

| ... | ... |
|---|---|
| ldx2st Xin-Pin, Pout, Tripacked, Strides; | arith Pout, Xin, Pin; |
| ldx2st Xin-Pin, Pout, Tripacked, Strides; | arith Pout, Xin, Pin; |
| ldx2st Xin-Pin, Pout, Tripacked, Strides; | arith Pout, Xin, Pin; |
| ldx2st Xin-Pin, Pout, Tripacked, Strides; | arith Pout, Xin, Pin; |
| ... | ... |
| or: | |
| ... | ... |
| ldx2st Xin-Pin, Pout_A, Tripacked, Strides; | arith Pout_A, Xin, Pin; |
| ldx2st Xin-Pin, Pout_B, Tripacked, Strides; | arith Pout_B, Xin, Pin; |
| ldx2st Xin-Pin, Pout_A, Tripacked, Strides; | arith Pout_A, Xin, Pin; |
| ldx2st Xin-Pin, Pout_B, Tripacked, Strides; | arith Pout_B, Xin, Pin; |
| ... | ... |
| etc. | |

In embodiments, each pair is an instruction bundle, i.e. executed simultaneously down respective pipelines. E.g. in embodiments the load-store instruction is executed by the main pipeline using the MRF, 26M, and the arithmetic instruction is executed in parallel by the auxiliary pipeline using the ARF, 26A. However in alternative realizations it is not excluded that the load-store and arithmetic instruction could be executed one-after-another through a single pipeline processing unit.

In the instances of the load-store instruction (Idx2st), Xin-Pin refers to the destinations $aDst of the two load operations in the ARF, 26A (e.g. a 4×f16 input vector Xin and a 2×f32 input vector Pin loaded into four 32-bit registers $aDst0:Dst0+3); and Pout refers to the source of the store in the ARF (e.g. 2×f32 values stored from two 32-bit registers $aSrc0:Src0+1). "Tripacked" refers to the triple-packed address register pair $nnAddr0:Addr0+1 in the MRF, 26M (e.g. holding three 21-bit address pointers in two 32-bit registers). "Strides" refers to the stride operands $mStride and Strimm, which specify the stride for each of the two loads and store operation, by reference to a field within the stride register $mStride in the MRF specified by three immediate values Strimm (see again FIG. 8). In the instances of the arithmetic instruction, Xin, Pin refer to the source registers from which inputs of the arithmetic instruction are taken, which are set to be the same as the destinations of the load performed by the load-store instruction in the current or a previous instruction pair. Pout refers to the destination for the output of the arithmetic instruction in the ARF, which is set to be the same as the source of the store operation of the load-store instruction in a subsequent instruction pair. In embodiments which execute each pair as a bundle of two simultaneous instructions, Xin, Pin are set to be the same as the destinations of the load performed by the load-store instruction in the previous bundle; and Pout is set to be the same as the source of the store operation of the Idx2st instruction in the next bundle. This re-uses the same registers, but because the two instructions are executed in parallel, the input data for the current arithmetic instruction is what was read by the previous load instruction. The current Idx2st then reuses those same registers to prepare the input data for the next arithmetic instruction.

So in each pair, the load-store (Idx2st) stores the output currently found in a register Pout from a previous arithmetic instruction in a previous instruction previous pair (e.g. bundle), and also loads values from memory into registers Xin and Pin. The following arithmetic instruction in the same pair (bundle) performs an arithmetic operation based on previously loaded values and outputs to a register Pout for storing by the store operation of a subsequent load-store instruction in a subsequent pair.

Note that in embodiments the arithmetic instruction has at least a third, implicit source in the shared WRF, 26W. These may be set by the supervisor thread writing to the WRF. Thus the supervisor sets common weights to be used implicitly by the arithmetic operations of all the executing worker threads.

The values of the memory addresses "Tripacked" specifying $nnAddr0:Addr0+1 in the MRF, 26M, are also set to some initial values by the respective worker. The stride values in the fields of each possible stride register $mStride in the MRF are also set by the respective worker. Each time the load-store instruction is executed, each of the three addresses (two load addresses and one store address) in the memory address registers $nnAddr0:Addr0+1 are post-incremented by the respective stride value. See again FIGS. 7 and 8. For instance, say the load-store instruction specifies $mStride=$mStrideA and Strimm=011000 (first immediate stride operand=01, second=10 and third=00). This means that after performing the first load, it increments the first load address by the stride value in field 0 of $mStrideA; after performing the second load it increments the second load address by the stride value in field 1 of $mStrideA; and after the store it increments the store address by the atomic increment (increment by a memory address step of 1 in the address space being used). Subsequent instances of the load-store instruction may be set to specify the same or a different value of $mStride, and the same or different values of each of the three immediate operands. Thus with each load-store instruction in the series, the locations of the loads and the store can be moved along in a controllable fashion. Thus the code can efficiently scan through the input data space in a flexible manner without needing additional integer arithmetic instructions to compute new addresses.

FIG. 9 illustrates an example application where this can be useful, namely performing a convolution of a kernel K with a multidimensional portion of input data Xin. For instance the input data may be a 3D volume of input data and the kernel K may be a 3D Kernel. The input data may also be called the called input channels, and the output data may be called output feature channels. Where it is said that the data is multidimensional, this means the data takes a value at each of a plurality of combinations of coordinates in a two-or-more-dimensional coordinate system, each dimension (i.e. each axis) representing a different independent variable (and the value of the data at a given combination of coordinates being the dependent variable).

An example of this would be in image processing where each data value represents a pixel. For instance, typically 8-bits are used for each of Red, Green and Blue; and those 8-bit integer values will then be converted to f16 values prior to the convolution operation. Each R,G,B value is treated as a separate input plane (i.e. separately input channel channel). So each 2D input image has x, y, z dimensions, with the R, G, B planes populating the z-axis. The volume of data may for example comprise a sequence of frames, where two dimensions of the volume represent the spatial x and y axis of the frame area and the third dimension represents the time axis corresponding to different frames in the sequence. In another example the three dimensions of the volume may represent three spatial x, y, and z dimensions of a 3D model or image of a space or object. In another example the data may be only two dimensional representing the spatial x and y axis of a still image, with the z axis representing a number of input images to be processed simultaneously. Note that the applicability of the disclosed techniques is not limited to image or graphics processing, and data with a higher dimensionality is also not excluded. E.g. the two, three or more dimensions could represent different aspects of users or their circumstances in an application learning user behaviour, etc.

The kernel K is a matrix of predetermined weights. It may represent a certain feature that the neural network is being trained to recognized, or that is being searched for in a subsequent inference. For instance in the case of image data the kernel may represent an edge or some other particular kind of shape. In a machine leaning application, each node in the neural network may correspond to a respective kernel (though as will be discussed further later, in many neural networks there are multiple nodes 102 that use the same kernel values but just have different connections 104). In embodiments each node 102 is represented by a respective worker thread, so each thread performs a respective convolution of a kernel K with that thread's respective input data. At least some of the worker threads may use the same kernel K whose values are stored in the shared weights register file (WRF) 26W, but each such thread convolves that kernel with the thread's own respective input data which is streamed from and to memory 22 via its own respective auxiliary (or arithmetic) register file (ARF), 26A.

A discrete convolution (*) in three dimensions may be expressed as:

$$Xin*K[x,y,z]=\Sigma\_x',y',z'(K[x',y',z']Xin[x-x',y-y',z-z'])$$

A convolution thus comprises scanning the kernel K systematically across some or all of the possible positions at which the kernel can be overlaid with the input data. At each such position, each pixel (or data point) in the part of the input data that overlaps with the kernel is multiplied by the value of the kernel at the corresponding overlaid point, and the results of each of these individual multiplications are summed to give a scalar output representing the convolution of the kernel with the input data at that particular overlaid position. This is then repeated at different scanned positions of the kernel relative to the input data Xin, in order to give a corresponding volume of output data (one scalar value per kernel position). For instance in the example illustrated in FIG. 9, the kernel K could begin placed in one corner within the volume of input data Xin, and each kernel value is multiplied by the data point it overlays when the kernel is at that position. The kernel is then moved along by one step along the length of the volume and the point multiplications and sum are performed again, this time with the kernel at the new position, etc. When the kernel has been scanned along the whole length of the volume, it is shifted to a new coordinate position and the lengthways scan is performed again, etc., until the whole volume has been scanned. The kernel at each given position generates one pixel (one scalar value) of the output data. Hence the output data Xout will have the same or a similar size to the input data, depending on the step size of the convolution scan.

In practice this needs to be broken down into smaller operations. This can be done by splitting the convolution of the data with the kernel at a given position into a number of individual vector dot products and partial sums. This is illustrated in the middle and right hand sides of FIG. 9. Say for example the kernel is 3×3×16 pixels in size ("pixel" not necessarily referring to images for the sake of the present discussion). I.e. it consists of 3 by 3 by 16 predetermined weights values. This can be broken down into nine 16-element vectors CW (also referred to herein as a constituent kernel of the kernel K). First the dot product (i.e. scalar product) is taken between one of these nine vectors and the input data at the corresponding position, to give a partial sum P (a scalar). Then the dot product is taken between another of the nine vectors and accumulated with the first partial sum to given a second partial sum (also a scalar). Then the dot product is taken between another of the nine 16-element vectors and the result of this is accumulated with the second partial sum to give a third partial sum, etc. Once this has been done to accumulate over all nine vectors, the total accumulation result gives the value of a single point or pixel in the output data Xout. This is then repeated at each kernel position as the kernel K is scanned over different positions relative to the volume of input data Xin, thus giving a corresponding volume of output data Xout (one output data point per kernel position).

In embodiments, to assist with performing computations such as convolutions in an efficient manner, the instruction set of the processor 4 includes an arithmetic instruction in the form of an accumulating product ("amp") instruction. It has the syntax:

amp $aDst, $aSrcA, $aSrcB, Phase where $aDst again refers to an operand specifying a destination in the ARF, 26A; and $aSrcA, $aSrcB refer to operands specifying two sources in the ARF. "Phase" is an immediate operand which specifies a phase of the accumulation. For example in embodiments the phase operand is formed of two bits specifying one of four possible phases 0 . . . 3. In embodiments the amp instruction may be referred to as f16v4sisoamp, referring to the fact that it takes one vector of four half-precision (16-bit) floating point values as a first input, and a single-precision (32-bit) floating point value as a second input; and outputs a single precision (32-bit) floating point value ("siso" referring to "single precision input, single precision output"). In fact in embodiments the second input is a pair of two single-precision floating point values (2×32-bits), as is the output. However it will be appreciated that these particular values of precision and number of elements are not limiting to all possible embodiments.

For one or more types of instruction such as the amp, in embodiments the location of the weights in the WRF is completely implicit. Alternatively or additionally, one or more other types of instruction may take an additional operand (not shown) specifying which set of weights to use from amongst a few different sets in the WRF. E.g. an example may be the slim convolution ("slic") instruction mentioned later.

Combined with the previously-described load-store instructions (ld2xst), an instruction such as the amp instruction can be used to efficiently steam data from memory, perform the dot products and partial sums, and stream the partial sums back into memory. Consider for example a program comprising a looped sequence of four instruction pairs, as follows.

```
Loop {
    ldx2st Xin-Pin, Pout, Tripacked, Strides;    amp Pout, Xin, Pin, Phase=0;
    ldx2st Xin-Pin, Pout, Tripacked, Strides;    amp Pout, Xin, Pin, Phase=1;
    ldx2st Xin-Pin, Pout, Tripacked, Strides;    amp Pout, Xin, Pin, Phase=2;
    ldx2st Xin-Pin, Pout, Tripacked, Strides;    amp Pout, Xin, Pin, Phase=3;
}
```

Another example version would be:

```
Loop {
    ldx2st Xin-Pin, Pout_A, Tripacked, Strides;    amp Pout_A, Xin, Pin, Phase=0;
    ldx2st Xin-Pin, Pout_B, Tripacked, Strides;    amp Pout_B, Xin, Pin, Phase=1;
    ldx2st Xin-Pin, Pout_A, Tripacked, Strides;    amp Pout_A, Xin, Pin, Phase=2;
    ldx2st Xin-Pin, Pout_B, Tripacked, Strides;    amp Pout_B, Xin, Pin, Phase=3;
}
etc.
```

Again, in embodiments each pair is an instruction bundle, i.e. executed simultaneously down respective pipelines, e.g. the main and auxiliary pipelines.

Each instruction pair comprises an instance of the load-store instruction followed by an instance of the accumulating product (amp) instruction. The sources of the amp instruction are the destinations of the two loads performed by the load-store instruction in the same or a preceding instruction pair (. In embodiments which execute each pair as a bundle of two simultaneous instructions, the sources of the amp (Xin, Pin) are set to be the same as the destinations of the load performed in the previous bundle. The destination of the amp instruction is the source of the one store performed by the load-store instruction in a subsequent instruction pair, e.g. next bundle. One of the sources $aSrcA, $aSrcB of the amp instruction is used to take an input vector x from the input data Xin. The other is used to take a partial sum. The amp instruction, when executed, performs a dot product of its input vector x with a corresponding vector of weights CW from the weights register file WRF, 26W (this vector CW being a constituent kernel of the overall or 3D kernel K). The phase operand specifies a phase for the purpose of accumulating the results of the dot products. In each instruction pair of the sequence in a given instance of the loop, the phase operand is set to a different respective value specifying a different successive phase of the sequence. Over these successive phases in the sequence as specified by the phase operand, the effect of the amp instruction is to accumulate the results of each successive dot products. The accumulation beings in the first phase in the sequence with an input partial sum.

The stride functionality of the load-store instruction enables the program to automatically shift along the memory addresses to the next piece of data with each instruction pair, without needing separate integer arithmetic instructions to compute new memory addresses to include in the MRF, 26M. The ability of the described load-store instruction to select any of a number of preprogramed strides from the stride register $mStride is especially useful to handle multidimensional data such as illustrated by way of example in FIG. 9. Memory space is one-dimensional but the data may have two, three or even more dimensions. Depending on the mapping of the 1D memory space to the multidimensional data space, then as the kernel K is scanned through the input data Xin, it may sometimes be necessary to make different sized steps through the corresponding memory addresses in the memory space. For instance as the kernel K is scanned lengthways along one dimension of the input data Xin then the memory address of the data at each scan position may increment in atomic steps, but when the scan needs to shift in the perpendicular plane, then a different sized step in memory address may be needed to get to the next piece or subset of the input data Xin (and independently, the same process is done for the second input and output addresses). The different fields in the stride register $mStride, or stride registers (e.g. $mStrideA, $mStrideB, . . . ) can advantageously be pre-programmed with different size jumps in memory space. The programmer or compiler can then set the immediate operands Strimm to select which jump size to use on a per load-store instruction basis (without needing separate integer arithmetic instructions to recalculate the next address or the next step size).

Figure 10:
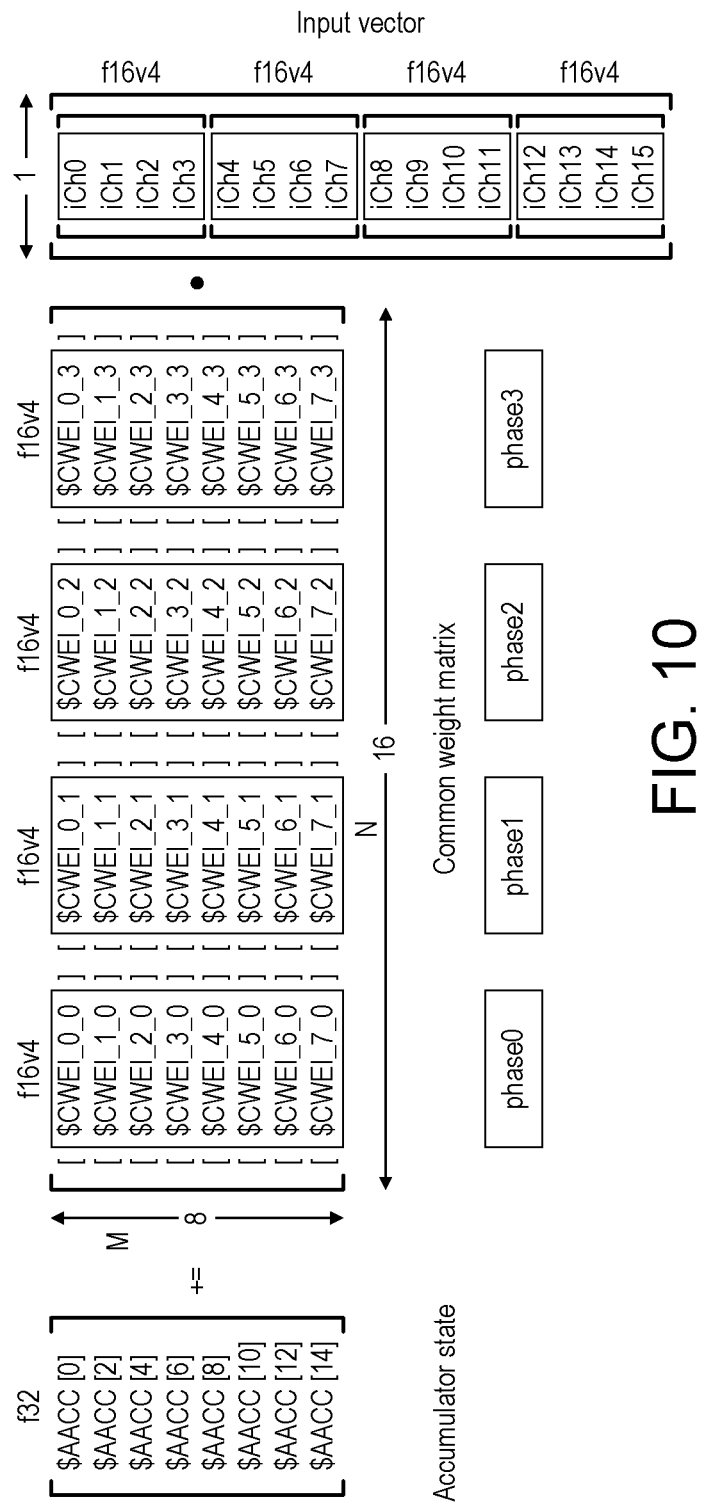

In embodiments the amp instruction is an accumulating matrix product instruction. The operation of this will be described by reference to FIGS. 10 to 12. As shown in FIG. 10, the amp instruction, when executed by the FPU, performs a multiplication of an M×N matrix of weights (from the WRF, 26W) with an N-element input vector from the input data Xin. In embodiments M=8 and N=16. Note that each of the M rows of the matrix correspond to a constituent vector from a different respective kernel K0, K1 . . . KM−1. Hence the amp instruction is used to perform a component of the convolution of M different kernels K with the input data in parallel. For instance each of these kernels may correspond to a convolution of a different respective feature (e.g. different edge or shape) with the input data. In the case of a convolutional neural network they are different feature filters, each one of the M kernels attempting to detect the presence of a different feature in the input layers. For a given kernel K, the amp instruction performs only a dot product and accumulation. However, the matrix allows multiple kernels to be efficiently convolved with the data in parallel.

The N-element input vector is split into N1 segments, each comprising a subvector of N2 elements (so N=N1×N2). In embodiments N1=4 and N2=4. The phase operand of the amp instruction takes one of N1 different possible values 0 . . . N1−1 corresponding to N1 different segments. In each instance of the looped sequence, the amp instruction in each successive pair takes a different value of the phase operand specifying a different successive one of the phases 0 . . . N1−1. Each phase performs the dot product of a corresponding one of the N1 subvectors of the N-element input vector, and each of the M rows of the matrix (so a part of the computation for each of the M different kernels K). The FPU in the execution unit 18 (in embodiments in the auxiliary or arithmetic execution unit 18A) has M accumulator states $AACC (per thread). In embodiments these are implemented as internal state 57 of the FPU. However in alternative implementations it is not excluded that they could be implemented as registers in one of the register files 26 (e.g. the ARF 26A of the respective thread). In the illustrated example these are the even numbered states $AACC[0], $AACC[2] . . . $AACC[14]; whilst the odd numbered states $AACC[1], $AACC[3] . . . $AACC[15] may be used to propagate values between different loops of the sequence, but this is an implementation detail and not limiting.

Figure 11:
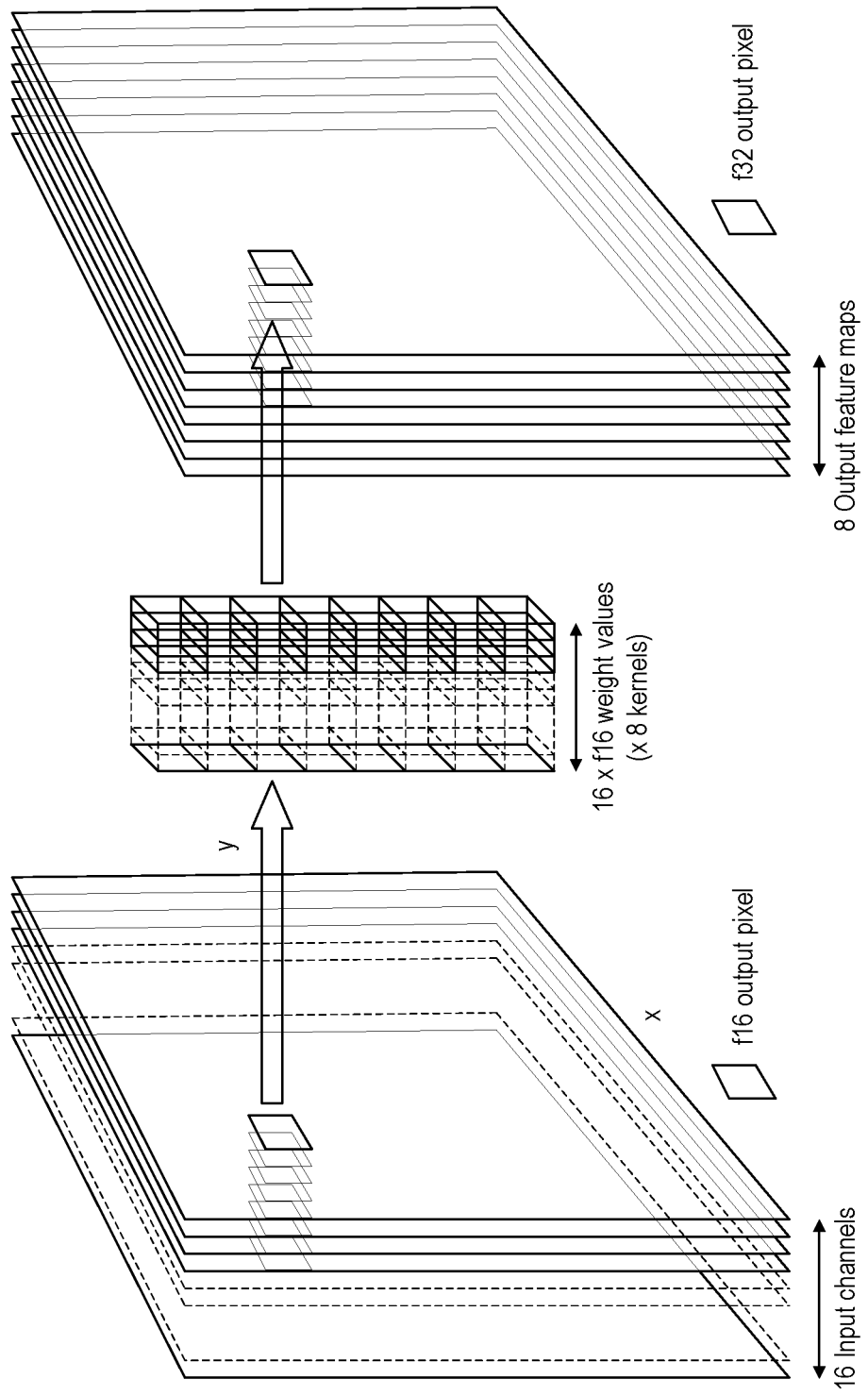

FIG. 11 illustrates the operation of the amp instruction diagrammatically. FIG. 12A-12B gives an example of a series of amp instructions. Each is understood to be preceded by a corresponding load-store instruction of an instruction pair, as shown above. In FIG. 12A, Pn is single-precision input partial-sum n, xn is an f16v4 input vector, CWm,n is the common weight state $CWEI_m_n, and Rn is the final single-precision result of successive dot-product accumulations that began with Pn.

In operation, in response to the (decoded) opcode of the amp instruction, the FPU of the execution unit 18 (in embodiments the auxiliary execution unit 18A) performs the following operations.

From the register(s) in the ARF 26A specified by one of the source operands of the amp instruction, it takes a number M/N1 of partial sums and places these temporarily in a propagator state for the next loop. This propagator state could be implemented in the internal state 57 of the FPU, or in alternative implementations it could be another register in one of the register files 26 (e.g. the ARF). Each phase takes a different subset of M/N1 partial sums. Over the N1 phases, M such partial sums are taken into the propagator state. So if M=8 and N1=4, then each amp instruction takes two partial sums (e.g. two f32 values) as an input and holds these in the propagator state, and over all four phases then eight partial sums are received.

From the register(s) in the ARF 26A specified by one of the source operands of the amp instruction, it takes an N2-element segment (subvector) of the input vector xin. For each of the M rows in the matrix (so each of the M kernels K0 . . . KM−1), it performs a dot product of this with a corresponding subvector of weights CW from the WRF. Which column the subvector of weights is taken from depends on the value of the phase operand. Further, if the phase is the first (i.e. initial) phase in the sequence, then a corresponding one of the partial sums is also added to each of the M dot products. Note that because each amp instruction in the previous loop took a respective M/N1 partial sums, where N1 is the number of phases, then the previous loop will have placed all M partial sums in the propagator state ready for the current loop.

For each of the M rows, the result of the above calculation is accumulated (summed) with any value already in a corresponding one of the M accumulator states $AACC, thus generating a corresponding one of M results R0 . . . RM-1. Over the N1 phases, the amp instruction will thus perform a dot product of the full N-element input vector with a corresponding N-element vector of weights from the WRF.

In the current loop, a number M/N1 of results R from the previous loop are output to the destination register(s) in the ARF specified by the destination operand of the amp instruction. Each phase outputs a different subset of M/N1 partial sums, and over the N1 phases, M such partial sums are taken into the propagator state. So in embodiments where M=8 and N1=4, then two results are output per amp instruction (e.g. two f32s), and all eight results R0 . . . R7 are output over all four phases.

After the last phase of the current loop (or at the start of the first phase of the next loop before any results are overwritten), the results R of the current loop are placed temporarily in a propagator state ready for output in the next loop. This propagator state could be implemented in the internal state 57 of the FPU, or in alternative implementations it could be another register in one of the register files 26 (e.g. the ARF).

To summarize, a single partial sum is: (1) added to the first dot-product result and stored in the accumulator state (overwriting the previously held value), (2) accumulated with three more dot-product results, and (3) copied into the temporary propagator state (in which case that value will be written to the destination operand of a future amp instruction). An alternative to step (3) is to either write the resulting partial sum straight out of the accumulator into the destination operand of the amp instruction. Either way, steps (1) and (3) may be overlapped in the hardware, providing a 4-cycle loop.

In embodiments the accumulator state does not need to be explicitly reset. Since the starting point for each matrix-vector multiply is the input partial-sum read from memory, the output volume has every element set to zero at the beginning of the convolution, rather than resetting the accumulator state. That said, in embodiments the tile 4 does indeed allow one to zero initialise all of the accumulator state.

Note that the input propagator state of the current amp instruction is held for use in the next loop. Also, the result output by the amp instruction to the destination register in the ARF is the existing accumulator state before the accumulation operation of the current amp is applied—it's the result of a previous short sequence of accumulations, that doesn't include the current input.

The program is configured (by the programmer or compiler) so that the results R become the partial sum inputs P for subsequent loops. The exact relation is down to the programmer or compiler and depends on the structure of the data and kernel. Typically the partial sums will have an initial value (in memory) of 0.

Note due to the lag between loops, the sequence requires a warm-up period. There is a latency between a particular input vector being presented and the result of the 4-phase calculation being returned by the amp instruction. That latency is fixed and means that the first M results are invalid, uninteresting or not meaningful, and are discarded in the warm-up code. After this warm-up period where no useful result is produced, the code then enters a repeat-loop which produces meaningful results which are stored to the required memory location. There is also a cool-down period after the inner loop where no new inputs are provided but where the final output values are stored. FIG. 12A-12B illustrates the warm-up period and "result latency" for f16v4sisoamp.

In embodiments the number of kernels M=8, the number of elements in the input vector N=16, and the number of phases N1=4. In embodiments each element of the input vector is an f16 value, and each input partial sum and each result is an f32 value. In such embodiments the above process can load and process data at a rate of two f32 partial sums and four f16 elements of the input vector per instruction pair, and can output and store data at rate of two f32 values per instruction pair. That's 128 bits of input and 64 bits of output per instruction pair. This corresponds to the two 64-bit wide load ports and one 64-bit wide store port between the LSU 55 and the data memory 22 (see again FIG. 4). Also, because of the triple packing of the addresses, the process can be handled via two 32-bit wide ports from the MRF 26M to the LSU plus another for the strides. Two 64-bit wide ports are used from the ARF 26A to the FPU in the auxiliary execution unit 18A.

The weights CW are taken from the shared WRF 26W and are the same for each thread. It turns out that in applications such as neural networks, there are a lot of scenarios where it is required to multiply (such as part of a convolution) the same set of weights with different data. For example some nodes in a neural network may comprise exactly the same weights but different connections. E.g. each kernel K(m=0 . . . M) may represents a convolution of a feature (e.g. an edge or shape) with the input data (e.g. an area or volume of graphical pixels). Therefore the worker threads corresponding to these kernels don't need separate weights. Instead there is provided just one copy of the weights state owned by the supervisor. The use of shared thread operands from shared weights register file thus advantageously requires less register space for the weights. FIG. 12A-12B shows that for each 16-element input vector, the loop produces 8 output values (1 output value per kernel). In this particular scenario, those output values are 32-bits each. The loop above works through 16 input values every 4 cycles (4×f16 input values every instruction). To sustain that rate of input, the processor 4 therefore produces 8×32-bit values every 4 cycle loop—which amounts to 4×64-bit stores per loop, or 1×64-bit store per cycle.

In embodiments the odd accumulators $AACC[1], $AACC[3], $AACC[15] are used to stagger the results (Rx), and to do the same to the partial-sum inputs (Px). The partial inputs are fed into accumulator registers $AACC[13] and $AACC[15]. Each cycle those values move forward into $AACC[11] and $AACC[9], while the values previously in $AACC[11] and $AACC[9] move into $AACC[7] and $AACC[5] and so on. When they reach their destination, they propagate into the even numbered accumulators, ready for the accumulation operation.

Figure 13:
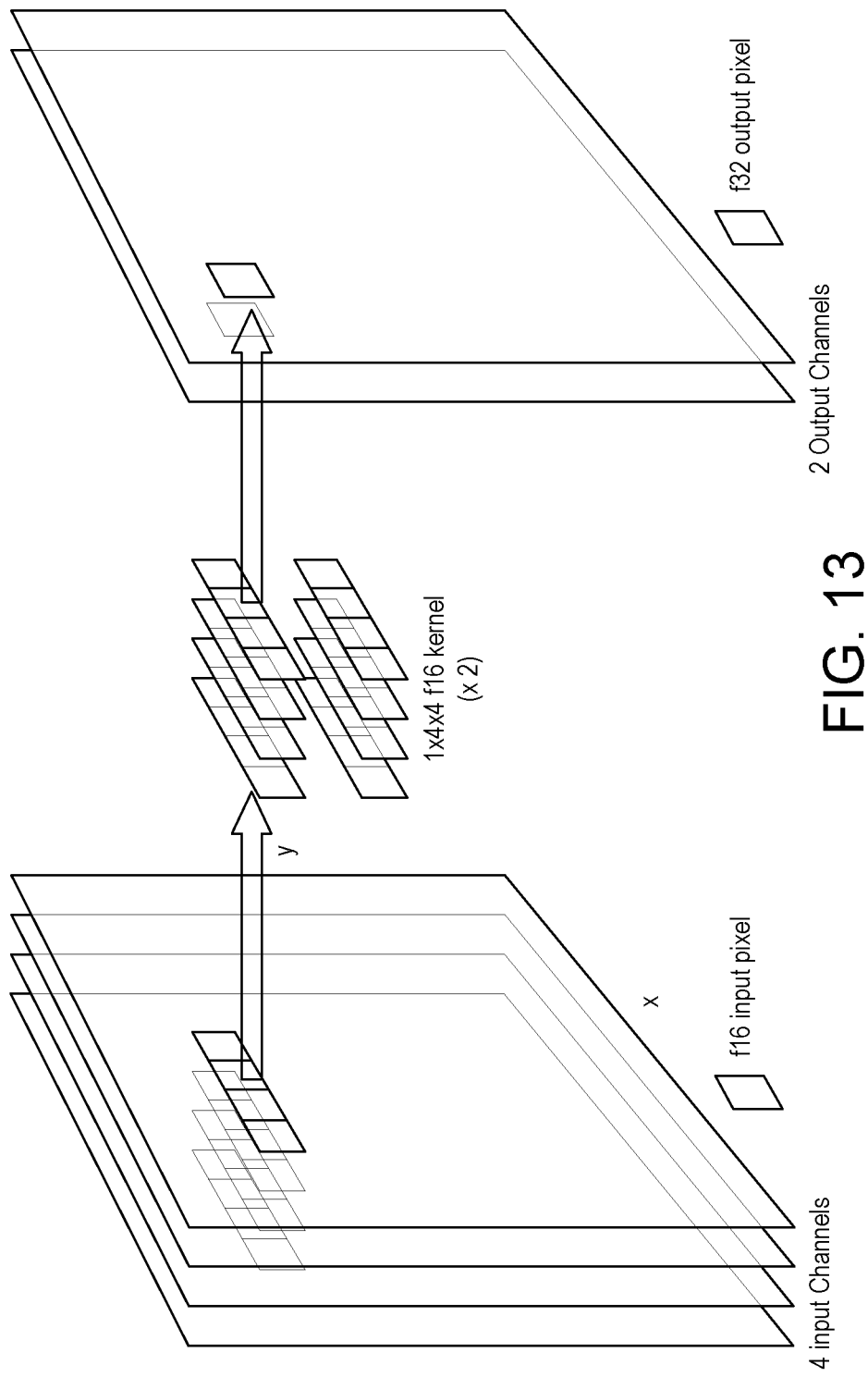

FIGS. 13 and 14A-14B illustrate another type of arithmetic instruction that may benefit from a load-store instruction of the type described herein, namely a convolution instruction which convolves the input data streamed via the ARF 26A of the respective thread with a 2D set of weights from the common weights register file (WRF) 26W. In embodiments this instruction may take the form of a half precision floating point vector slim convolution (slic instruction), e.g. "f16v4slic" referring to the fact that it operates on 4-element subvectors of f16 values. It has one half precision and one single precision input, and a single precision output. slic is similar and uses the same hardware as amp. However this instruction performs a 1×4×4 convolution (which is a true convolution) for each of 2 kernels, rather than a 1×1×16 accumulating dot product for each of 8 kernels. In fact in embodiments, it can be configured to perform a 1×N×4 convolution where N is 2, 3 or 4.

The accumulating matrix product ("amp") and slim convolution ("slic") instructions facilitate high performance multiply accumulate sequences, for scenarios where weight sharing across worker contexts is appropriate. In embodiments amp and slic instructions may be supported for both single-precision and half-precision number formats and operate in the same basic manner. The common compute configuration state (comprising the shared weights in the WRF 26W) is first initialised by the supervisor context. Two streams of input data are then processed: the input activation (pixel) data, and the partial-sum values specifying a starting value for a subsequent multiply-accumulate sequence (for convolutions these are the partially-computed pre-activations). A single stream of output data is produced: the resulting, accumulated partial-sum values. Each partial-sum input value is subjected to a fixed-length sequence of multiply-accumulate operations, before the final partial-sum result is presented as an output. Many dot-product and accumulate operations occur in parallel, performed by compute engines. The first multiplicand is provided by the input data stream and the second is provided by the common compute configuration state.

The following table lists some example amp and slic instruction variants, any or all of which may be included in the processor's instruction set in embodiments.

| Instruction | Input data format | Input partial-sum format | Output partial-sum format |
|---|---|---|---|
| f16v4sisoamp | Half-precision (v4) | Single-precision (v2) | Single-precision (v2) |
| f16v4hihoamp | Half-precision (v4) | Half-precision (v2) | Half-precision (v2) |
| f16v4sihoamp | Half-precision (v4) | Single-precision (v2) | Half-precision (v2) |
| f32sisoamp | Single-precision (scalar) | Single-precision (v2) | Single-precision (v2) |
| f16v4sisoslic | Half-precision (v4) | Single-precision (v2) | Single-precision (v2) |
| f16v4hihoslic | Half-precision (v4) | Half-precision (v2) | Half-precision (v2) |
| f16v4sihoslic | Half-precision (v4) | Single-precision (v2) | Half-precision (v2) |
| f32sisoslic | Single-precision (scalar) | Single-precision (v2) | Single-precision (v2) |

Note: for some types of instruction the location of the weights is completely implicit, but for others they take an operand selecting which of a number of different sets to use in the WRF. The f16v4sisoslic instruction for example only requires a quarter of the weight state of f16v4sisoamp. As a result software is allowed to preload up to 4 sets of weights. The weight-set selection is specified by two bits of an immediate operand. For f16v4sisoamp on the other hand, this takes the full weights state and so there is no selection within it.

It will be appreciated that the above embodiments have been described by way of example only.

For instance, the scope of the present disclosure is the above-described architecture in which a separate context is provided for the supervisor thread, or in which the supervisor thread runs in a slot and then relinquishes its slot to a worker. The supervisor could instead use a general purpose context. Or In another arrangement for example, the supervisor may run in its own dedicated slot. Further, the implementation is not limited to specific one of the threads even having a supervisor role, or indeed to multi-threading at all. The techniques disclosed herein may also be used on a processor that does not employ non-multithreaded execution. Further, the scope of the disclosure is not limited to the processor 4 being a tile in an array of tiles. In alternative embodiments the processor 4 could for example be a stand-alone processor or single-chip processor.

The implementation of the execution unit 18 is not limited to separate main execution unit 18M and auxiliary execution unit 18A; nor separate MRF and ARF. Nor is it limited to use of a separate WRF. In general the registers could be from any one or more register files, which could be shared between different memory access and arithmetic operations, or separated.

The arithmetic instructions with which the disclosed load-store instruction can be used are not limited to matrix product or convolution instructions. More generally instances of the load-store instruction can also be used to stream data from memory, and stream results back to memory, for any type arithmetic instruction or combination of instructions that take at least two input operands and output at least one result. E.g. the load-store instruction type could be used with a non-accumulating matrix product instruction where the accumulation is done in separate instructions or general purpose code, or other sequences of matrix multiplications other than convolutions, where the results of previous products are not necessarily the inputs of subsequent products. Also the load store could be used with vector dot product or accumulating vector dot product instructions—i.e. the arithmetic instructions don't' have to be applying M different kernels in parallel.

Further, the scope of the present disclosure is not limited to the particular register sizes, port bit widths, numbers of ports, value precisions, vector sizes or matrix sizes disclosed above by way of example. Other register and port bit widths are possible, as are other precisions of values, and other vector or matrix sizes (e.g. in terms of number of elements). Further, in other implementations, other packings of the two load and one store address into two registers are possible, e.g. three 10-bit addresses in two 16-bit registers, or three 42-bit addresses in two 64-bit registers. Also the load and store addresses don't necessarily have to be the same length. Further, other packings of the strides values into the stride register are also possible in alternative implementations, e.g. four 8-bit stride fields in a 32-bit register, etc.

In yet further variants, the applicability of the disclosure is not limited to image processing. The term "kernel" as used herein could mean any matrix of weights applied as part of any process comprising operations such as vector multiplication, matrix multiplication or convolution, or others (e.g. correlation). Also the application ability is not limited to 3D volume of data. The input data (and the kernel) could be linear or 2D, or have a greater multi-dimensionality (>3 independent variables or degrees of freedom). Further, the scope of the disclosure is not limited to machine learning applications. There are many other applications where it may be desired to perform processes such as those comprising vector multiplications, matrix multiplications and/or convolutions, etc.

Other variants or use cases of the disclosed techniques may become apparent to the person skilled in the art once given the disclosure herein. The scope of the disclosure is not limited by the described embodiments but only by the accompanying claims.

What is claimed is:

1. A processor comprising an execution unit, memory, and one or more register files comprising a plurality of registers, the execution unit being configured to execute instances of instructions from an instruction set defining types of machine code instructions, each of the machine code instructions consisting of an opcode and zero or more operands; wherein:
the execution unit comprises a load-store unit, and the types of instructions defined in the instruction set include a load-store instruction having operands specifying, from amongst the registers in at least one of the one or more register files, a respective destination of each of two load operations, a respective source of a store operation, and a pair of address registers arranged to hold three memory addresses, the three memory addresses being a respective load address for each of the two load operations and a respective store address for the store operation;
the load-store instruction further includes three stride operands each specifying a respective stride value for each of the two load addresses and the store address, wherein at least some possible values of each stride operand specify the respective stride value by specifying one of a plurality of fields within a stride register in one of the one or more register files, each field holding a different stride value; and
the load-store unit is configured so as, in response to the opcode of the load-store instruction, to load a respective portion of data from the memory from each of the two load addresses into the respective destination of the respective load operation, to store a respective portion of data from the source of the store operation into a location in said memory identified by the store address, and following each of the load and store operations to increment the respective address by the respective stride value.

2. The processor of claim 1, wherein the load-store instruction further comprises a stride register operand for specifying the stride register from amongst a plurality of possible registers in one of the one or more register files.

3. The processor of claim 1, wherein for each of at least one of the stride operands, one possible value of the respective stride operand specifies a stride value of one unit, and a plurality of other possible values of the respective stride operand specify different ones of the fields in the stride register.

4. The processor of claim 1, comprising three ports to the load-store unit from the one or more register files including the pair of address registers and the stride register, the load-store unit being configured to use a respective one of the ports for each of the pair of address registers and one of the ports to access the stride register.

5. The processor of claim 4, wherein each of the three ports has a bit-width equal to a bit width of the respective address register or stride register it is used to access.

6. The processor of claim 1, wherein each of the pair of address registers is 32 bits wide, and each of the load and store addresses is 21 bits wide.

7. The processor of claim 1, wherein:
the types of instructions defined in the instruction set further include an arithmetic instruction which takes operands specifying, from amongst the registers in at least one of the one or more register files, sources from which to receive a first input and a second input and a destination to which to a output a result; and
the processor is programmed to run a program comprising a series of instructions comprising instances of the load-store instruction and instances of the arithmetic instruction, wherein the sources of at least some of the instances of the load-store instruction are set as the destinations of at least some of the instances of the arithmetic instruction and the destinations of at least some of the instances of the load-store instruction are set as the sources of at least some of the instances of the arithmetic instruction.

8. The processor of claim 7, wherein:
said series comprises a series of instruction pairs, each instruction pair consisting of an instance of the load-store instruction and a corresponding instance of the arithmetic instruction; and
in each instruction pair, the source of the instance of the load-store instruction is set as the destination of the instance of the arithmetic instruction from a preceding one of the pairs, and the destinations of the instance of the load-store instruction are set as the sources of the instance of the arithmetic instruction in the current or a subsequent one of said pairs.

9. The processor of claim 8, wherein each of the inputs and the result comprises at least one floating point value, and wherein the execution unit comprises a floating point arithmetic unit configured to perform arithmetic operations in response to the opcodes of the instances of the arithmetic instruction.

10. The processor of claim 9, wherein each of the instructions pairs is an instruction bundle to be executed simultaneously, and the processor is divided into two parallel pipelines, a first of which comprises the load-store unit arranged to execute the instance of the load-store instruction of each bundle, and a second of which comprises the floating point arithmetic unit arranged to execute the corresponding instance of the arithmetic instruction in parallel.

11. The processor of claim 8, wherein at least one of the instances of the arithmetic instruction is a vector dot product instruction, accumulating vector dot product instruction, matrix product instruction, accumulating matrix product instruction, or convolution instruction.

12. The processor of claim 8, wherein:
the arithmetic instruction is an accumulating matrix product instruction for multiplying an N-element input vector with an M×N matrix of M kernels, each of the M kernels also being an N-element vector, wherein the accumulating matrix product instruction further takes an immediate operand specifying a phase from amongst a number N1 of successive phases;
the series of instructions comprises a sequence repeating in a loop, the sequence repeating in the loop comprising a sequence of N1 of said instructions pairs, wherein an instance of the accumulating matrix product instruction in each successive pair in the sequence repeating in the loop has a different value of the phase operand specifying a different successive phase of the sequence repeating in the loop, from an initial phase to an $N1^{th}$ phase;

in each phase the first input is a respective subvector of the input vector for the respective iteration of the loop and the second input is a respective set of one or more partial sums, the number of elements in each input subvector being N2=N/N1, and the number of partial sums in each set being Np=M/N1; and each instance of the accumulating matrix product instruction specifies an arithmetic operation in a phase of an iteration of the loop, said arithmetic operation in each phase of each iteration of the loop, other than the first and last iterations of the loop, comprising:

copying the respective set of Np partial sums from the second input of the respective instance of the accumulating matrix product instruction into a temporary propagator state for use in the next iteration of the loop;

for each of the M kernels, performing a dot product of the respective input subvector of the current phase with a respective N2-element subvector of the kernel, thereby producing a corresponding intermediate result for each of the M kernels;

if the phase operand of the respective instance of the accumulating matrix product instruction specifies the initial phase, adding the corresponding partial product from the previous iteration of the loop to each of the M intermediate results;

for each of the M kernels, adding the corresponding intermediate result to each of M elements of an accumulator state; and outputting a respective subset of Np of the elements of the accumulator state from a current or previous iteration of the loop as output results to the destination of the respective instance of the accumulating matrix product instruction.

13. The processor of claim 12, wherein the program comprises a warm-up period before generating useable output results.

14. The processor of claim 12, wherein M=8, N=16, N1=4, N2=4 and Np=2.

15. The processor of claim 12, programmed to use the sequence repeating in the loop to perform a convolution, the input vector in each iteration of the loop representing a different sample of a portion of input data, and results from earlier iterations of the loop being used as the partial sums for later iterations of the loop.

16. The processor of claim 15, wherein the portion of input data comprises a three_dimensional (3D) volume of data, and each of said M kernels represents a one-dimensional (1D) constituent part of a corresponding one of M larger 3D kernels, the results from earlier iterations of the loop being used as at least one of the partial sums for later iterations of the loop so as to build a convolution of each 3D kernel with input data from corresponding 1D constituent parts.

17. The processor of claim 16, wherein each of the 3D kernels represents a set of weights of a node in a neural network.

18. The processor of claim 15, wherein each value of M represents the convolution of a different feature with the input data.

19. The processor of claim 12, wherein each element of the input vector is a 16-bit floating point value, and each element of each kernel is a 16-bit floating point value.

20. The processor of claim 12, wherein each of the Np output results is a 32-bit floating point value.

21. The processor of claim 12, wherein:
the one or more register files comprise a first register file and a separate second register file, wherein the address registers are registers in the first register file, and the source and destinations of an instance of the load-store instruction are registers in the second register file; and
the one or more register files further comprise a third register file separate from the first and second register files, and the kernels are held in the third register file.

22. The processor of claim 8, wherein:
the one or more register files comprise a first register file and a separate second register file, wherein the address registers are registers in the first register file, and the source and destinations of an instance of the load-store instruction are registers in the second register file; and
the sources and destination of an instance of the arithmetic instruction are registers in the second register file.

23. The processor of claim 1, wherein the one or more register files comprise a first register file and a separate second register file, wherein the address registers are registers in the first register file, and the source and destinations of the load-store instruction are registers in the second register file.

24. The processor of claim 23, wherein the stride register is a register in the first register file.

25. A method of operating a processor, the method comprising:
receiving a load-store instruction as a single machine code instruction having operands specifying, from among registers of the processor, a first destination of a first load operation and a second destination of a second load operation, a source of a store operation, and a plurality of address registers arranged to hold a first load address for the first load operation and a second load address for the second load operation and a store address for the store operation; and
executing the load-store instruction, including:
loading data from the first load address into the first destination and loading data from the second load address into the second destination;
storing data from the source of the store operation into a location, in memory of the processor, identified by the store address; and
incrementing the first load address by a first stride value, incrementing the second load address by a second stride value, and incrementing the store address by a third stride value, each of the first stride value, the second stride value, and the third stride value being specified by a respective one of a plurality of stride operands of the load-store instruction.

26. The method of claim 25, wherein the plurality of stride operands comprises:
a first stride operand specifying a first field in a stride register of the processor, the first field including the first stride value;
a second stride operand specifying a second field in a stride register of the processor, the second field including the second stride value; and
a third stride operand specifying a third field in a stride register of the processor, the third field including the third stride value.

27. The method of claim 25, further comprising:
running a program including an arithmetic instruction, wherein the source of the load-store instruction is set as a destination of the arithmetic instruction.

28. The method of claim 25, further comprising:
running a program including an arithmetic instruction, wherein the first destination of the load-store instruction is set as a source of the arithmetic instruction.

29. A computer program product embodied on non-transitory computer-readable storage, comprising code configured to run on a processor, wherein when executed the code causes the processor to:
receive a load-store instruction as a single machine code instruction having operands specifying, from among registers of the processor, a first destination of a first load operation and a second destination of a second load operation, a source of a store operation, and a plurality of address registers arranged to hold a first load address for the first load operation and a second load address for the second load operation and a store address for the store operation; and
execute the load-store instruction, including:
loading data from the first load address into the first destination and loading data from the second load address into the second destination;
storing data from the source of the store operation into a location, in memory of the processor, identified by the store address, and
incrementing the first load address by a first stride value, incrementing the second load address by a second stride value, and incrementing the store address by a third stride value, each of the first stride value, the second stride value, and the third stride value being specified by a respective one of a plurality of stride operands of the load-store instruction.

30. The computer program product of claim 29, wherein the code further causes the processor to:
run a program including an arithmetic instruction, wherein the source of the load-store instruction is set as a destination of the arithmetic instruction.

31. The computer program product of claim 29, wherein the code further causes the processor to:
run a program including an arithmetic instruction, wherein the first destination of the load-store instruction is set as a source of the arithmetic instruction.

* * * * *